(12) United States Patent
Mariotti

(10) Patent No.: US 8,863,339 B2
(45) Date of Patent: Oct. 21, 2014

(54) MULTIPURPOSE TOOL

(75) Inventor: Michael Mariotti, Munich (DE)

(73) Assignee: Angelzubehor Mane UG, Garching (DE)

( * ) Notice: Subject to any disclaimer, the term of this patent is extended or adjusted under 35 U.S.C. 154(b) by 0 days.

(21) Appl. No.: 14/112,950

(22) PCT Filed: Apr. 20, 2012

(86) PCT No.: PCT/EP2012/057327
§ 371 (c)(1),
(2), (4) Date: Nov. 6, 2013

(87) PCT Pub. No.: WO2012/143538
PCT Pub. Date: Oct. 26, 2012

(65) Prior Publication Data
US 2014/0075680 A1    Mar. 20, 2014

(30) Foreign Application Priority Data

Apr. 21, 2011   (DE) .......................... 10 2011 007 909
May 23, 2011   (DE) .......................... 10 2011 076 288
Nov. 4, 2011    (DE) .......................... 10 2011 085 779

(51) Int. Cl.
| | | |
|---|---|---|
| *A01K 97/00* | (2006.01) | |
| *B26B 11/00* | (2006.01) | |
| *B25F 1/00* | (2006.01) | |
| *A22B 3/10* | (2006.01) | |
| *A01K 91/04* | (2006.01) | |
| *A22B 3/08* | (2006.01) | |

(52) U.S. Cl.
CPC . *A01K 97/00* (2013.01); *A22B 3/10* (2013.01); *A01K 91/04* (2013.01); *A22B 3/083* (2013.01)
USPC ...................................... 7/106; 7/118; 7/144

(58) Field of Classification Search
CPC .............. B25F 1/02; B25F 1/04; B25F 1/003; B25F 1/006; B25B 7/22; A01K 97/18; A01K 97/10; A01K 91/04; B26B 11/001; B26B 11/006; B26B 11/003; B26B 1/02; B25G 1/02; A22C 25/025; A22C 25/006; A22B 3/10; A22B 3/083
USPC .............. 452/102–105; 7/106, 118–120, 128, 7/137, 144, 158
See application file for complete search history.

(56) References Cited

U.S. PATENT DOCUMENTS 177,696 A * 5/1876 Davis .................................. 7/118
554,046 A * 2/1896 Billings .............................. 7/118
(Continued)

OTHER PUBLICATIONS

International Search Report for PCT Application No. PCT/EP2012/057327, Dec. 13, 2012.

*Primary Examiner* — Hadi Shakeri
(74) *Attorney, Agent, or Firm* — Altman & Martin; Steven K Martin

(57) ABSTRACT

The present invention generally relates to a multipurpose tool for angling. In particular, the invention relates to a threading device for threading or affixing, respectively, a fishing hook to a fishing line. Furthermore, the Invention relates to a method of manufacturing the threading device for threading or affixing, respectively, a fishing hook to a fishing line, the use of the device as well as a threading set. The present invention further relates to a multipurpose tool for stunning and eviscerating fish. In particular, the invention is concerned with a multipurpose tool of the type of a pocket knife, which is suitable for stunning and eviscerating fish and whose posterior end is formed as a stunning tool.

9 Claims, 13 Drawing Sheets

(56) References Cited

U.S. PATENT DOCUMENTS

| | | | |
|---|---|---|---|
| 717,408 A * | 12/1902 | Jacobsen | 7/106 |
| 912,411 A * | 2/1909 | Putney | 30/144 |
| 1,546,975 A * | 7/1925 | Feller | 7/106 |
| 1,788,656 A * | 1/1931 | Brown | 7/106 |
| 2,353,416 A * | 7/1944 | Silver | 7/144 |
| D201,173 S * | 5/1965 | Velt Kamp | 452/103 |

\* cited by examiner

MULTIPURPOSE TOOL

FIELD OF INVENTION

The present invention generally relates to a multipurpose tool for fishing. In particular, the invention is concerned with a threading device for threading or affixing, respectively, a fishing hook to a fishing line. The invention further relates to a method for manufacturing a threading device for threading or affixing, respectively, a fishing hook to a fishing line to the use of the device, and to a threading set. Furthermore, the present invention generally relates to a multipurpose tool for stunning and eviscerating fish. In particular, the invention is concerned with a multipurpose tool of the type of a pocket knife, which is suitable for stunning and eviscerating fish and whose posterior end is configured as a stunning tool.

STATE OF THE ART

Fishing hooks may be attached to a fishing line in a number of different ways, the most frequent of which include affixing the line via the eye or the shaft of the hook. With respect to the last method, the line is conducted along the shaft and fixed to the shaft by coiling around a thin wire or thread. The loose ends of the wire or thread may be affixed by tying or gluing. These attachment methods are suited for mechanical processing (see EP 0502193 B1), but also for manual fixation (see GB 1 319 312). A disadvantage might result from an insufficient strength of the connection between both, the hook and the line.

For individual usage, the preferred method for affixing the hook to the line is the threading of the line via the eye. A number of devices are known from the state of the art, which are supposed to facilitate the threading of a thin line into the—generally—small eye, when conditions are unfavorable, i.e. in bad light, during cold or rainy weather.

The utility model DE 9 014 454 U1 relates to a holding device for a fishing hook, in particular for a fishing hook armed with a bait, wherein the hook (including the bait) is stabilized in a sling under spring tension, thereby facilitating the affixing of the line.

Document U.S. Pat. No. 6,474,013 B2 discloses a holding device for a hook and a threading aid, wherein hooks of different sizes are stabilized in a clam-shell housing between two opposing surfaces and wherein the eye extends over the rim of the holding device for threading the line.

Document U.S. Pat. No. 4,697,370 B1 discloses a threading device for fishing hooks, wherein the line is guided via a funnel shaped opening into the eye of the hook aligned by a holding device. Document U.S. Pat. No. 6,625,921 is an improvement to U.S. Pat. No. 6,041,541 and relates to a simple funnel shaped threading aid made from plastics, wherein the round eye of the hook is placed in close proximity to the tip of the funnel and the line is guided to the eye by the walls of the funnel. A similar technical teaching allowing for more variability with respect to shape and dimensioning of the eye is disclosed in U.S. Pat. No. 7,793,459 B1, wherein the threading aid is manufactured from a rubber and a closed cell foam having memory properties.

Disadvantages of the aforementioned state of the art are either due to the elaborate construction of the devices, resulting on high manufacturing costs (U.S. Pat. Nos. 4,697,370; 7,793,459; DE 9 014 454 U1), or due to limitations regarding the form (U.S. Pat. No. 6,474,013 B2) or the size of the eye (U.S. Pat. No. 6,625,921). Moreover, many devices of the state of the art harbor a substantial risk of injury due to the tip of the hook, projecting from the device during threading (U.S. Pat. Nos. 6,625,921, 7,793,459).

In §4 of the German Animal Protection Act (Tierschutzgesetz, TierSchG) the stunning of animals prior to slaughtering is codified, whereby slaughter of an animal is permitted only if the animal is stunned; otherwise slaughter is permitted only, where reasonable and appropriate, when pain is avoided. Stunning and slaughter of fish and other cold-blooded animals is governed by the Order on the Protection of Animals in connection with slaughter and killing (Tierschutz-Schlachtverordnung, TierSchlV). In §13 of this order it is determined that animals are to be stunned, such that they may be quickly and under avoidance of pain and suffering be put in a state of unconsciousness and insensibility, which must last until death. For killing fish, §13 (5) of this order is applicable, wherein it is specified that whoever wishes to slaughter or kill a fish, has to stun the animal immediately prior to the killing procedure. Different methods are employed for stunning fish, among them electrical or chemical anesthesia (using $CO_2$, Ammonia, Eugenol, Isoeugenol, for reference, see Oetinger, 2003). Concussion provides for a safe and reliable stunning method, meeting the standards of animal welfare and protection, whereby the animal stress is controlled and negative effects with respect to product quality are negligible. Concussion involves the application of a short, sharp blow to the top of the skull of the fish just above the eyes. If executed correctly, stunning is immediate and may, depending upon the species of fish, lead to death, (e.g. trout, whitefish) or at least persist until death (e.g. carp, pike). Utensils used for stunning often are not adapted to ensure an anesthesia sufficiently deep or prolonged, in particular, if utilized by an amateur, conducting the method only occasionally.

After stunning and slaughtering, the fish has to be eviscerated as quickly as possible under satisfactory hygiene conditions according to the Food Hygiene Regulation (Lebensmittelhygieneverordnung, LMHV, Anlage I, 2.3), with exceptions for specific species of fish. Thereby, colonization (originating from the guts) by bacteria, e.g. toxin-forming clostridia, and parasites, e.g. nematodes, of those parts of fish intended for consumption may be reduced reliably to a large extent.

Therefore, the object of the present invention is to provide for a device which is easy to handle and which is adapted to allow for reliable, efficient and reproducible stunning of fish by even inexperienced anglers. A further object of the invention is to provide for a device, which allows, upon stunning, for the rapid and safe slaughter, evisceration, and, where required, scaling of the fish.

The utility patent DE 6900481 U relates to a multipurpose tool for anglers and fishermen, which is adapted to facilitate the various tasks after catching. Various parts of the multipurpose tool therefore serve as a gill hook, a mouth opener, a hook remover, a scaling device, and as a fish hanger. The utility patent DE 20 2004 019 954 U1 discloses a multipurpose tool for anglers comprising a threading device, a splicing needle, a boilie drill, and a boilie needle.

DE 1 803 751 and DE 1 762 307 relate to multipurpose tools for anglers containing a hook remover, a forceps and a hook sharpener. The latter document discloses a multipurpose tool for line fishermen, which comprises several pivoting tools as in a knife of the pocket knife type, in particular a rasp, a scissor and a nail-like thorn. When using it, the different tools are folded out such that the angler can utilize them anytime (p. 3, 11. 1-3).

The multipurpose tools of the state of the art are disadvantageous in that they are not suited for stunning and killing fish, as they are either too small or do not comprise appropriate surfaces. Furthermore, most of the aforementioned multipurpose tools are too low of weight such that a reproducible stunning effect may not be achieved by employing a blow to the top of the head; instead, the stunning depends upon the direction and the strength of the blow. Inexperienced anglers, however, may not estimate reliably the strength required for stunning such that at least some fish might experience pain when killed.

DETAILED DESCRIPTION OF THE INVENTION

Starting from the above considerations, the object of the present invention is the provision of a device and a method for threading or affixing, respectively, a fishing hook to a fishing line, which overcomes the problems and deficiencies known from the state of the art. Similarly, the object of the present invention is the provision of a multipurpose tool for the stunning and the evisceration of fish, which overcomes the problems and deficiencies known from the state of the art.

An object of the present invention therefore is the provision of a threading device for a fishing hook, allowing for fast and reliable threading of the fishing line into eyes of fishing hooks or flies of various dimensions when conditions are unfavorable, i.e. during bad light, cold, windy or rainy weather). Threading therefore should be possible without bending the hook or fly or without injury to the angular by the hook's tip during threading. The hook/the fly should be clamped in a stable position within the threading device during the threading process and should be easily removable from the device after successful threading. Further, the threading device should be of simple design in order to keep manufacturing costs as low as possible.

The problem underlying the invention is solved by the device of the invention, by its method of manufacturing and by its method of use according to the claims, as will be apparent from the following examples.

In the first aspect, the invention therefore relates to a threading device (1) for a hook, comprising a handle (2) with an anterior (3) and a posterior end (4) and an insert (5) with a largely conical taper. The anterior end (3) is formed with a first recess (6) exhibiting a largely conical taper, wherein an entrance aperture (7) of the first recess (6) facing the anterior end (3) preferably is of a larger diameter compared to a floor surface (8) of the first recess (6) facing the posterior end (4). The handle (2) comprises a cylindrical cavity (9) open to the anterior (3) and posterior end (4), said cylindrical cavity (9) abutting on the first recess (6) exhibiting a largely conical taper. The first recess (6) is formed with at least one opening (11) running along the generatrix of the cone (10). The insert with a largely conical taper (5) is insertable in an interlocking manner into the first recess (6). Furthermore, the threading device (1) comprises a second recess (12) exhibiting a largely conical taper, being formed in the anterior end (3) of the handle (2). The second recess (12) encompasses the opening (11) running along the generatrix of the cone (10).

The anterior end (3) of the handle (2) is configured with a first recess (6) exhibiting a largely conical taper. In the context of this disclosure, the indication of the quantity "one" is understood to mean "one or more" or "at least one" unless indicated otherwise. In other words, the anterior end (3) of the handle (2) may be arranged with one or more first recesses (6) exhibiting a largely conical taper. Thereby, the term "cone" refers to a component exhibiting the form of a frustum. A geometrical frustum is created by cutting in parallel to the base surface a smaller cone from a larger cone, thereby giving rise to a conical body with two circular areas arranged in parallel and of different size, which delimit on both sides the lateral surface of the frustum. The larger of the two circular areas is the base surface, the smaller is floor surface. Accordingly, a conically tapered recess is understood to refer to an opening within the anterior end (3) of the handle (2), which is formed as a frustum. Preferably, the first recess (6) exhibiting a largely conical taper is configured as a right frustum; as a matter of principle, however, other geometrical forms are possible, e.g. as an oblique frustum, as polygonal frustum (e.g. pyramidal frustum) or as frustums originating from an ellipsoid or a sphere. The term "generatrix" refers to a straight line, which runs on the lateral surface of a body of rotational symmetry along its rotational axis. The sum of all generatrices of such a rotational symmetric body therefore forms the lateral surface; in here, the lateral surface of a frustum. In the case of the cone or frustum, respectively, of the invention, the generatrix (10) represents the shortest straight line between the tip of the frustum (the floor surface (8)) and the rim of the entrance aperture (7, corresponding to the base surface).

With respect to spatial orientation, the first recess (6) exhibiting a largely conical taper is arranged within the handle (2), such that the entrance aperture (7) of the first recess (6) facing the anterior end (3) preferably is of a larger diameter compared to a floor surface (8) of the first recess (6) facing the posterior end (4).

The tilt angle (or cone generating angle) (13) of the first recess (6) exhibiting a largely conical taper results from the relation between the diameter of the entrance aperture (7), the floor surface (8) and the height (14) of the cone according to the formula $$\tan \text{tilt angle (13)} = \frac{\text{diameter entrance aperture (7)} - \text{diameter base surface (8)}}{2 * \text{height(14)}}$$

Preferably, the tilt angle (13) is between 15° and 40°, especially preferred between 20° and 30°.

The handle (2) is formed with a cylindrical cavity (9) which is open to the anterior (3) and posterior end (4). The term "cylindrical" according to the invention refers to a geometrical body delimited by a lateral surface and two parallel planar surfaces, corresponding to the base and the floor surface. The lateral surface is delimited by straight lines arranged in parallel. A cylindrical body is created by moving a planar surface along a straight line, which is not located within the plane, up to the height h.

Accordingly, the term "cylindrical cavity" in the context of the invention refers to a cavity of the type of a cylinder. Preferably, the cylindrical cavity (9) is a right circular cylinder; as a matter of principle, however, other geometrical forms a possible, e.g. an oblique cylinder or any oblique or right cylinder. The cylindrical cavity (9) abuts on the floor surface (8) of the first recess (6) via a floor surface aperture (31).

The cylindrical cavity (9) which is open to the anterior (3) and posterior end (4) may be arranged within at least one removable and/or slidable plate (42), located at the posterior end (4) of the handle (2). Thereby, the cylindrical cavity (9) connects via the floor surface aperture (31) to the floor surface (8) of the first recess (6) exhibiting a largely conical taper. Preferably, the floor surface aperture (31) of the cylindrical cavity (9) thus arranged within the plate (42) on the handle (2) is formed with engagement means (42), e.g. a circumferential increment in the form of a frustum running around the floor surface aperture (31). Alternatively, the floor surface aperture

(31) may be formed with accepting means (44), e.g. a circumferential recess in the form of a frustum running around the floor surface aperture (31). In a further implementation of the threading device (1) of the invention the handle (2) may be formed within close proximity of the floor surface aperture (31) with at least one engagement means (43) or at least one accepting means (44).

The cylindrical cavity (9) may exhibit a slit opening (45) along its height, wherein the term "slit opening" according to the invention refers to a longitudinal, narrow opening. This slit opening (45) of the cylindrical cavity (9) may serve as a passage for the fishing line (22) after completion of the threading process.

The handle (2) may preferably consist of a hard and/or water-repellent material selected from the group consisting of wood, polymer or metal. The at least one removable and/or slidable plate (42), which is arranged at the posterior end of the plate (42), may preferably consist of a hard and/or water-repellent material selected from the group consisting of wood, polymer or metal.

In the context of the invention, an insert (5) with a largely conical taper is meant to refer to at least one insert (5) with a largely conical taper. The dimensions of the insert (5) with a largely conical taper is selected such that the insert and may be placed into the first recess (6) in an interlocking and largely slip-free manner. It's form therefore is preferred to be complementary to the geometrical form of the first recess (6). The insert (5) with a largely conical taper preferably is configured as a hollow cylinder. In the context of the invention, the term "hollow cylinder" refers to a hollow body characterized by an inside radius, an outside radius and a height, as well as a difference between the outside radius and the inside radius, being a measure of its wall thickness. The insert (5) of the invention therefore is formed with an inside radius (15), an outside radius (16) and a height (17). The insert (5) of the invention is characterized further by an insert entrance aperture (18) facing the anterior end (3) and an insert outlet aperture (19) facing the posterior end (4), wherein the insert entrance aperture (18) has a larger diameter than the insert outlet aperture (19).

In the context of the invention, an insert (5) with a largely conical taper may also refer to an insert (5) formed as a double cone. A double cone arises out of two cones overlapping at their respective tips. The insert (5) of the invention may be formed such that the outer surface of the insert (5), being insertable interlockingly into the first recess (6) of the handle (2), is configured as a cone at large, while the interior of the insert (5) may be configured as a double cone (46). Preferably, the interior of the insert (5) may be arranged as an asymmetrical double cone (46). It is preferred in particular, if the insert entrance aperture (47) of the double cone (46) facing the posterior end (4) of the handle (2) exhibits a largely smaller diameter compared to that insert entrance aperture (47) of the double cone (46) facing the anterior end (3) of the handle (2).

Preferably, the insert entrance aperture (47) of the double cone (46) facing the posterior end (4) of the handle (2) is dimensioned in a way as to interact interlockingly with engagement means (43) being formed on the floor surface aperture (31) of the cylindrical cavity (9), which in turn is arranged within the handle (2) or within the plate (42). Engagement means (43) may be realized in the form of a frustum-like increment surrounding the floor surface aperture (31) of the cylindrical cavity (9). Increment and insert entrance aperture (47) of the double cone (46) may be arranged as engagement means (43) and complementary accepting means (44).

The insert (5) with a largely conical taper, situated interlockingly within the first recess (6), is accessible from the outer face (20) of the handle (2) via the opening (11) along the generatrix (10). The second recess (12), being arranged in the anterior end (3) of the handle (2), encompasses the opening (11) along the generatrix (10). In the context of the invention, a second recess (12) arranged in the anterior end (3) of the handle (2) is meant to refer to at least one second recess (12) thus formed. In a preferred embodiment, the second recess (12) may constitute the larger part of the insert outer surface (32).

By means of the threading device (1) the hook/fly (21) may be clamped stably in the insert (5) with a largely conical taper for threading the fishing line (22), thereby significantly facilitating threading due to a largely fixed positioning of the eye (23) of the hook.

The insert (5), being situated interlockingly and thereby slip-free within the first recess (6) with a largely conical taper, serves to adjust the eye (23) of the hook. According to its size, the eye (23) is placed in a position of greatest possible proximity to floor surface (8) of the first recess (6), wherein the floor surface (8) is configured such as to allow the utilization of standard eyes (23). Thereby, the point of the hook (23) preferably rests within the second recess (12) of the handle (2) such that the risk of injury of the angler during threading of the fishing line (22) is reduced significantly. Furthermore and to particular advantage, the second recess (12) permits threading of differently formed fishing hooks (21). Due to the limited wall thickness at the height of the floor surface (8), short shanked hooks or flies, for example, may be adjusted and threaded as easily as fishing hooks (21), which are configured in an angular arrangement of eye (23) and shank (25), e.g. flies or Sneckbent hooks. The fishing line (22) may be guided manually along the inner surface (39) of the insert (5) with a largely conical taper towards the eye (23), which is arranged in a close spatial relationship to the floor surface (8) of the first recess (6), and may be pushed towards the posterior end (4) of the handle (2) via the cylindrical cavity (9), which is open to both ends.

In a preferred embodiment, the threading device (1) is configured with an insert (5) such that the outer surface of the insert (5), being insertable interlockingly into the at least one first recess (6) of the handle (2), exhibits a largely conical shape, while the interior of the insert (5) is formed as a double cone (46). The cylindrical cavity (9), which is open to the anterior (3) and posterior end (4), may be arranged within at least one removable and/or slidable plate (42), located at the posterior end of the handle (2), whereby the floor surface aperture (31) of the cylindrical cavity (9) may comprise at least one engagement means (43). It is particularly preferred, if the insert entrance aperture (47) of the double cone (46), facing the floor surface aperture (31), is configured such that it may accommodate engagement means (43) for interlocking. With the threading device (1) thus formed, the fishing hook/fly (21) may be clamped positively for threading within the gap formed by the insert entrance aperture (18) and the engagement means (43). Thus, threading is significantly facilitated since the eye (23) of the hook is positioned nearly immovably.

In a favored implementation, the first recess (6) with a largely conical taper and the second recess (12) may be arranged within an anterior half of the handle (2), whereby an anterior half is determined with respect to the overall length of the handle (2). It is particularly preferred, if the first recess (6) with a largely conical taper and the second recess (12) are arranged within an anterior quarter of the handle (2), wherein an anterior quarter is determined with respect to the overall length of the handle (2). Due to the dimensioning, the threading device (1) may be grasped easily between two fingers of a hand, without touching the fishing hook (21) or fly situated in the second recess (12). With relation to the form of the handle (2) of the threading device (1), there are no limitations as a matter of principle. For example, round, angular, symmetrical or asymmetrical arrangements are possible, i.e. all forms, which accommodate a cylindrical cavity (9) abutting the floor surface (8), said cavity being open to both ends for the passing of the fishing line (22).

In a favored embodiment, the handle (2) of the threading device (1) may be configured longitudinally, wherein the overall length is between 1.5 and 7.0 cm. Thereby, the threading device (1) may be grasped easily between two fingers of a hand, while the whole hand may be used if necessary. Preferred is a length of 2.5 to 4.5 cm, particularly preferred is a length of 2.5 to 3.8 cm. By way of an arcuate sling (26) which is located preferably at the posterior end (4) of the handle (2), the handle (2) may be affixed to other objects for storage, e.g. to a belt or a snap hook.

In a further preferred implementation, the threading device (1) of the invention is formed with a triangular handle (2), whose height is equal or smaller compared to its width. Alternatively, the handle (2) may be configured as a hollow cylinder, whose height is equal or smaller compared to its radius. A multi-part handle (2) may be configured at its posterior end (4) with at least one removable and/or slidable plate (42). The at least one cylindrical cavity (9), being open towards the anterior (3) and the posterior end (4), may be configured within the plate (42) and may connect to the floor surface (8) of the at least one first recess (6) with a largely conical taper via the floor surface aperture (31). Preferably, the threading device (1) may be configured with at least two first recesses (6) and at least two second recesses (12). The insert (5) to be placed interlockingly within the first recess (6), in each case may be configured such that the outer surface of the insert (5) exhibits a largely conical form, while the interior of the insert (5) is configured as an asymmetrical double cone (46). The respective insert entrance apertures (47) of the double cones (46), facing the posterior end (4) may be configured with different diameters. Engagement means (43), which are arranged on the respective floor surface apertures (31) of the respective cylindrical cavities (9) in the plate (42), may be formed as frustums of different sizes. For example, a frustum serving as engagement means (43) exhibiting a small outside radius (48) may interact with an insert entrance aperture (47) of a double cone (46) exhibiting as small inner radius (15). Likewise, a frustum serving as engagement means (43) exhibiting a large outside radius (48) may interact with an insert entrance aperture (47) of a double cone (46) exhibiting as large inner radius (15). Alternatively, the respective insert entrance apertures (47) of double cones (46) facing the posterior end (4) may exhibit similar diameters, while engagement means (43), e.g. frustums, exhibit a different size. In particular, differently sized engagement means (43), e.g. frustums, may be configured on a removable and/or slidable plate (42), the latter of which is facing the anterior end (2) of the multi-part handle (2), and may be allocated to respective complementary excepting means (44) by sliding or turning the plate (42).

In a further alternative, the respective insert entrance apertures (47) of the double cones (46), facing the posterior end (4), may exhibit different diameters while engagement means (43), e.g. frustums, may be of the same size. Such a threading device (1) may enable convenient threading of all kinds of different fishing hooks/flies (21).

In another embodiment of the threading device (1), the first recess (6) exhibiting a largely conical taper, being formed within the anterior end (3) of the handle (2), is configured with a diameter of the entrance aperture (7) facing the anterior end (3) of between 4.0 and 7.0 mm, and with a diameter of the floor surface (8) facing the posterior end (4) of between 0.6 mm and 1.6 mm. It is particularly preferred, if the diameter of the entrance aperture (7) facing the anterior end (3) is between 4.8 and 6.0 mm, and the diameter of the floor surface (8) facing the posterior end (4) is between 0.8 mm and 1.2 mm. Such a first recess (6) is sufficiently large to accommodate eyes (23) of commonly used fishing hooks as well as an insert (5) with a largely conical taper. The opening (11) of the first recess (6), running along the generatrix (10) is configured such that the insert (5) and/or the clamped hook/fly (21) may be removed easily from the first recess (6). Preferably, the opening (11) exhibits a length, at the end facing the entrance aperture (7), of between 1.5 to 2.3 mm and, at the end facing the floor surface (8), of between 0.3 to 0.9 mm; as a matter of principle, the opening (11) may be configured in a different geometrical form, e.g. with equal ends on both sides.

In a further the implementation of the threading device (1), the insert (5) with a largely conical taper may be arranged with a slit opening (28) along its generatrix (28), wherein the term "slit" in the context of the invention refers to a narrow longitudinal opening. The slit opening (28) serves as a guiding channel for the shank (25) of the hook when adjusting the eye (23), as stabilizer of the fishing hook (21) during the threading process and as a passage for the fishing line (22) after threading. The wall thickness (29) of the insert (5) is formed such that a shank (25) of a commonly used hook made from conventional materials may be introduced into the slit opening (28) without exercising significant force and without bending. The wall thickness (29 of the insert (5) is defined by the difference between the inside radius (15) and the outside radius (16) of the insert (5). While the outside radius (16) is dimensioned such as to enable interlocking and largely slip-free placement of the insert (5) within the first recess (6), the dimensioning of the inside radius (15) is determined at large by the properties of the material from which the insert (5) is made. Preferably, the insert (5) has a wall thickness of equal or smaller than 1 mm, especially preferred is a wall thickness of equal or smaller than 0.5 mm.

The selection of the material of the insert (5) with a largely conical taper is governed by the requirements posed by e.g. the size of the hook and the material of either the hook or fly. A polymer material is preferred, which exhibits sufficient elasticity in order for a shank (25) to be introduced into and stabilized in the slit opening (28) without bending. In a preferred embodiment of the threading device (1), the insert (5) with a largely conical taper may be made from thermoplastic and/or elastomeric, synthetic and/or biogenic polymer, wherein those inserts (5) are suited particularly, which consist of a polymer material with a modulus of elasticity of between 0.005 and 1.5 GPa [kN/mm$^2$]. The modulus of elasticity refers to a material characteristic known from material engineering, describing the relation between a solid object's tendency to be deformed elastically when a mechanical force is applied to it, e.g. under a tensile load measured according to e.g. EN ISO 527-1. It is particularly preferred, if the insert (5) is made from a polymer material with a modulus of elasticity of between 0.001 and 0.2 Gpa.

Further, the insert (5) may consist of a polymer material with a hardness of 50 to 100 Shore A, preferably with a hardness of 60 to 85 Shore A, especially preferred with a hardness of 65 to 70 Shore A. The Shore hardness is a material characteristic for polymer material, specified in the German material standards DIN 53505 and DIN 7868. In a particularly preferred implementation, the insert (5) is made of elastomer, selected from the group consisting of rubber, natural rubber, styrene-butadiene rubber, acrylonitrile-butadiene rubber, chloroprene rubber, isobutene-isoprene rubber, acrylate rubber, ethylene-propylene copolymer, chlorosulfonated polyethylene, silicone rubber, polyether urethane, polyester urethane, or other elastomer materials with comparable properties. Alternatively, the insert (5) may consist of polymer material of lesser elasticity, if for example the borders of the slit opening (28) might be pulled apart via integral ridges serving as hinges for accommodating the fishing hook (21).

In a preferred embodiment of the threading device (1) the insert (5) may be configured such that the outer surface of the insert (5) exhibits a largely conical form, whereas the interior of the insert (5) is arranged as an asymmetrical double cone (46). Preferably, the insert entrance aperture (18) of the double cone (46) facing the posterior end (4) of the handle (2) is configured as to envelop engagement means (43), which are arranged at the floor surface aperture (31) of the cylindrical cavity (9) of either the handle (2) or the plate (42). By means of such a threading device (1), a fishing hook/fly (21) may be clamped interlockingly into the gap formed in between the insert entrance aperture (18) and engagement means (43). In particular, an insert (5), consisting of a polymer material of 50 to 100 Shore A, preferably of 60 to 85 Shore A, especially preferred of 65 to 70 Shore A, allows for convenient clamping of the eye (23) of a hook into the gap formed in between the insert entrance aperture (18) and engagement means (43) due to its elastic properties. Hook eyes (23) of different dimensions may be positioned immovably at large within the gap formed in between an insert entrance aperture (18) and appropriately fitting engagement means (43), which are arranged on a slidable plate (42) and which may be selected by turning and/or sliding. Threading is significantly facilitated utilizing such a threading device (1), since the eye (23) of the hook may be positioned immovably, while at the same time, the eye (23) of the hook may be easily removed from the threading device (1).

In another implementation, the insert (5) with a largely conical taper is made of a dark polymer. The term "dark" thereby refers to a color with only a minor lightness. The lightness (also value or tone; a parameter within the HSV color space) is a percentage scale (0%=no brightness, 100%=full brightness) describing the subjective brightness perception of an object, wherein the brightness indicates how light or dark a body appears. Particularly advantageously, a color may be used with a lightness of ≤25%. The insert (5) thus configured exhibits excellent optical properties since even a thin fishing line (22) made of transparent polymer material is set apart optically from the insert (5) during threading such that its progression may be monitored easily.

In another embodiment of the threading device (1), the floor surface (8) of the first recess (6) with a largely conical taper is made of a ferromagnetic material. The ferromagnetic material is a material exhibiting magnetization in an external magnetic field which is independent of the external field. Ferromagnetic materials are e.g. iron, cobalt, nickel, and ferromagnetic alloys, such as AlNiCo, SmCo, Nd2Fe14B, Ni80Fe20, or NiFeCo alloy. Preferably, the floor surface (8) is made of iron. By providing a magnetic floor surface (8), the adjustment of even the smallest eyes (23) may be facilitated excellently, since the head (30) of the hook is pulled toward the floor surface (8). As the floor surface (8) is continuing via the floor surface aperture (31) into the cylindrical cavity (9) of the handle (2), the former being open towards the anterior (3) and posterior end (4), the eye (23) of the hook is simply pulled by magnetic force around the floor surface aperture (31) of the floor surface (8) such that an additional manual adjustment is unnecessary. With a magnetized floor surface (8) it is possible to adjust almost all fishing hooks/flies (21) made from steel or an alloy using magnetic force, since in general all steels are magnetic (excepting austenitic stainless steels).

In another implementation of the threading device (1) for a hook, the first recess (6) exhibiting a largely conical taper may be formed with a guide channel (33), said guide channel (33) running along the generatrix (10). In addition, the insert with a largely conical taper (5) may be configured on an insert outer surface (32) with a profile (34) corresponding to said guide channel (33). By combining the guide channel (33) and the profile (34), guidance of the insert (5) within the first recess (6) may be easily controlled. Preferably, guide channel (33) and profile (34) are configured such that, after insertion of the insert (5) into the first recess (6), the slit opening of the insert (28) is situated largely in the middle of the opening (11) of the first recess (6) along its generatrix (10). It is also preferred to configure the insert (5) with a strap (35) or any other gripping device, thereby facilitating removal of the insert (5) after threading. The guide channel (33) within the first recess (6) is not limited with regard to its geometrical form; for example, the guide channel (33) may be extending along of only a part of the generatrix (10). The complementarity at large of the guiding means which the first recess (6) and the insert (5) may be arranged with is singularly advantageous in that a simple adjustment of both, the opening (11) of the first recess (6) and the slit opening (28) of the insert (5) may be achieved.

In a further embodiment, the insert (5) may be positioned in the first recess (6) in a slip-free and irreversible manner, e.g. by means of glue or a comparable fastening method. Thereby, the insert (5) is positioned within the first recess (6) such that the slit opening (28) of the insert is situated largely in the middle of the opening (11) of the first recess (6) along its generatrix (10). In the case of an insert (5) being positioned slip-free and irreversibly within the first recess (6), guiding channel (33) and corresponding profile (34) may be dispensed with, since the insert will not be inserted into and removed from the threading device (1) repeatedly. Thus, manufacturing will be simplified and manufacturing costs may be reduced. For the singular insertion of the insert (5) into the first recess (6), a careful adjustment of the slit opening (28) of the insert (5) with regard to the middle of the opening (11) of the first recess (6) along its generatrix (10) has to be performed prior to permanent fixation.

In another embodiment of the threading device (1), the second recess (12) may be arranged as a notch, said notch being at least bipartite. The notch may be characterized by a top surface (36), which is facing the anterior end (3) and which encompasses the opening (11) of the first recess (6), and by the bottom surface (37), facing the posterior end (4). The top (36) and the bottom surface (37) may be connected obliquely along an axis of symmetry by a straight line, which runs at the height of the floor surface (8) and largely in parallel to it. Advantageously, the top surface (36) of a second recess (12) configured as a bipartite notch may form part of the outer wall of the first recess (6). The top (36) and the bottom surface (37) may be connected preferably at an oblique angle, especially preferred is an oblique connection with an angle of between 90° and 140°. Both surfaces (36, 37) may be of different size. The second recess (12) may be arranged on the handle (2) such that it's bottom surface (37), which faces the posterior end (4), extends almost all the way towards the posterior end (4) of the handle (2). This is advantageous, since on the one hand, excellent stability of the outer wall of first recess (6) is achieved; on the other hand, a large number of different fishing hooks/flies (21) may be introduced without problems. Furthermore, such a second recess (12) may be easily realized technically, such that manufacturing costs may be reduced.

In a different implementation of the threading device (1) of the invention, the device may be configured in the way of a multipurpose tool, additionally including a line-clipper (49) which is formed within or on the handle (2). Furthermore, a puncturing aid (50) for flies may be positioned within or on the handle (2), said puncturing aid (50) preferably being moved between a working and a resting position via a clamping mechanism (51), e.g. a spring.

In a second aspect, the invention relates to a method of manufacturing the threading device (1) for a hook, wherein the insert (5) with a largely conical taper is placed along the guide channel (33) within the first recess (6).

In a third aspect, the invention relates to the use of the threading device (1) for a hook for threading a fishing line (22), comprising the steps as listed in the following.

In a first step, the use comprises the placement of a hook (21) into the insert (5) with a largely conical taper along the slit opening (28) such that the eye (23) of the hook is facing the center of the first recess (6). In a second step the use comprises the arrangement of the eye (23) of the hook in the spatially closest proximity to the floor surface (8) of the first recess (6).

As an alternative to the first and second step, the eye (23) of the hook may be clamped within the threading device (1) in a single step. In this case, the interior of the insert (5) is configured in the form of an asymmetrical double cone (46). Therein, the insert entrance aperture (47) of the double cone (46), facing the posterior end (4), is configured as to adopt engagement means (43) in an interlocking manner, the engagement means (43) in being arranged on the floor surface aperture (31) of the cylindrical cavity (9) formed within the handle (2) or the plate (42). With the threading device (1) thus formed, the fishing hook/fly (21) may be clamped positively for threading within the gap formed by the insert entrance aperture (18) and the engagement means (43).

In a third step, the use comprises guiding of the fishing line (22) along an insert inner surface (39) in the direction of the eye (23) of the hook, through the eye (23) of the hook and through the cylindrical cavity (9).

In a fourth step, the use comprises pulling the hook (21) with the threaded fishing line (22) from the insert (5) after the appearance of the fishing line (22) at the posterior end (4) of the handle (2).

The use of such a threading device (1) for threading a fishing line (22) via an eye (23) of the hook harbors only a minimal risk of injury by the point (24) of the hook due to its being situated within the second recess (12). This is the case even when using fishing hooks (23), which are configured in an angular arrangement of eye (23) and shank (25), e.g. flies, Sneckbent hooks. The points (24) of hooks or larger flies will not be damaged or bent during threading, since they are positioned in the second recess (12) during threading and also clamped securely within the slit opening (28) of the insert (5).

In a fourth aspect, the invention relates to a threading set (40) for fishing hooks, comprising the threading device (1) and at least one additional insert with a largely conical taper (5). Preferably, the inserts (5) of the threading set (40) are made of different materials. Furthermore, inserts (5) of the threading set (40) may be configured with different dimensions, for example, in a threading set (40) inserts (5) with a different wall thickness (29) may be combined. The use of such a threading set (40) comprising different inserts (5) allows for convenient threading of a large number of different fishing hooks and/or flies (21) using a single set.

It is required by law that appropriate anesthesia has to be applied prior to the killing of fish in order to avoid pain. Particularly in commercial fishing proof of sufficient anesthesia may be requested, whereby, for example, fish is examined after killing with respect to stress indicators (e.g. by determining the concentration of catecholamines and cholesterols in their blood). Also in recreational fishing, proper anesthesia of the animals is mandatory, whereby anglers and fishermen are generally less experienced in taking the appropriate measures safely and with confidence. The multipurpose tool of the invention therefore allows for a reliable and gentle stunning of small and larger fish. By means of the stunning tool formed at the posterior end of the multipurpose tool fish of different size may be stunned with relatively little expenditure of force under the provision of proper fixation. The multipurpose tool comprising the stunning tool may be used excellently single-handedly, such that the spare hand may be used for securely fixing the fish. The specific distribution of weight within the multipurpose tool, with a center of mass arranged in the direction of the stunning tool, in particular facilitates one-handed application. Working tools situated at the anterior end of the multipurpose tool may be used for killing and evisceration immediately after a successful stunning blow has been applied. When evisceration is conducted promptly after catching the fish, danger of colonization by bacteria and parasites of those parts of fish intended for consumption may be reduced reliably to a large extent. Due to easy operability, the multipurpose tool of the invention provides for fast and reliable handling of fish after catching also in recreational fishing.

The problem of the invention is solved by the device of the invention according to the claims, as will be apparent from the following examples.

Therefore, the invention relates to a multipurpose tool (101) of the type of a pocket knife which is suited excellently to stunning and eviscerating fish. The multipurpose tool (101) of the invention is configured with an anterior (102) and a posterior end (103), but other geometrical forms are also possible (e.g. round, triangular). The multipurpose tool (101) comprises two lateral members (105), said lateral members (105) serving as a handle (104) and being firmly attached to each other, wherein at least two working tools are arranged in the recess in between the two lateral members (105). Each working tool is unfoldable into a position of use oriented in parallel to the lateral members (105), which are arranged largely in parallel, whereby said position of use is defined by at least one abutment position. The posterior end (103) of the multipurpose tool (101) is arranged as a stunning tool (106) with a weight made from metal or an alloy, said stunning tool (106) being formed largely hemispherical. The center of mass of the multipurpose tool (101) is distributed advantageously such that the weight of the posterior third of the multipurpose tool (101), encompassing the posterior end (103), is equal to or larger than half of the overall weight of the multipurpose tool (101). The at least two working tools situated in the recess in between the lateral members (105) may be folded individually into the direction of the anterior end (102) and preferably comprise at least an evisceration knife (107) and a blunt-ended scraping tool (108).

The multipurpose tool (101) such arranged has a center of mass being located in the direction of the stunning tool (106) thereby allowing for the excellent transmission of power, originating from the blow movement conducted by the angler, from the stunning tool (106) to the skull of the fish to be stunned. It is thus possible to apply a higher force to the skull of the fish, compared to conventional sticks and bats, at the same impact speed, which is advantageous with respect to a quick and reliable stunning of the catch. Due to the smaller size of the multipurpose tool (101) in comparison to conventional sticks and bats, which is adapted to the average size of a hand, the shifting of the center of mass to the posterior third of the multipurpose tool (101), encompassing the posterior end (103), does not occur at the expense of controllability and precision during the stunning blow. The multipurpose tool (101) thus arranged may be used outstandingly in a one-handed way, such that the angler has a spare hand to be used for securing the fish in order to ensure a reliable anesthesia.

In a preferred embodiment, the weight of the stunning tool (106) may be regulated by the user according to the anticipated size of the catch, in that e.g. additional weights may be introduced to the stunning tool (106) from below its fixing means. Alternatively, stunning tools (106) of different weights may simply be placed onto suitable attachment means via respective fixing means. Hence, the multipurpose tool (101) of the invention may be adapted excellently to the special requirements of the catch.

After a successful stunning blow, the working tools, being individually foldable and comprising at least one evisceration knife (107) and a scraping tool (108), may be used for immediate killing and evisceration of the stunned fish.

In a further implementation, the multipurpose tool (101) may exhibit a weight of up to 750 g. Preferred are multipurpose tools (101) with a total weight of up to 500 g, especially preferred is a weight of between 350 and 450 g. A multipurpose tool (101) dimensioned as such allows for a reliable stunning effect with respect to the sizes of fish to be expected in recreational fishing, without at the same time splitting the skull of the animal. With regard to the stunning effect, it is held that the weight of the stunning tool (106) positively correlates to the degree of stunning. This advantage is counterbalanced by unfavorable handling properties of heavy equipment, especially in the case when only one hand may be used for applying the stunning blow. Furthermore, heavy equipment is difficult to transport. The multipurpose tool (101) of the invention therefore is suited excellently to allow for quick and sufficiently deep stunning when stunning is executed by applying a single handed stunning blow; at the same time, multipurpose tool (101) may be transported and stowed away easily due to its specific dimensions.

In a further embodiment, the stunning tool (106), being formed as a largely hemispherical weight, may be made from metal or an alloy, and may be formed with a coating (109) consisting of metal, an alloy or a thermoplastic and/or duroplastic polymer. Preferably, the metal or the alloy is selected from the group consisting of titanium, stainless steel and/or knife steel. Thereby, stainless steel is to be understood as a low- or high-alloy steel of particular purity. Stainless steels are considered alloyed steels containing a minimum of 10% chromium (DIN EN 1088-1) and, where appropriate, further alloying constituents such as nickel, molybdenum, manganese and niobium. Knife steel is considered a material suitable for knifes, characterized by a hardness of a minimum of about 55 HRC (determined according to Rockwell C), high strength and good corrosion resistance. Preferably, the stunning tool (106) of the multipurpose tool (101) of the invention, being formed as a largely hemispherical weight, consists of stainless steel or knife steel with high corrosion resistance.

In another implementation, the stunning tool (106), being formed as a largely hemispherical weight, may consist of a ferromagnetic material. In a preferred embodiment, the stunning tool (106) may be formed with a nucleus of a high density metal, e.g. lead or iron, surrounded by a coating (109) of stainless steel. In a further embodiment, a coating (109) consisting of a thermoplastic or duroplastic, synthetic, and/or biogenic polymer may surround the stunning tool (106) formed with a nucleus of a high density metal. The stunning tool (106) such designed, may be characterized by significantly lower costs of materials compared to a stunning tool (106) consisting of stainless steel, representing a cost advantage with respect to production. Preferably, the coating (109) of the stunning tool (106) is suitable for use in salt- and freshwater, especially preferred is a coating (109) made from stainless steel. The handle (104) of the multipurpose tool (101) of the invention may preferably consist of a hard and/or water-repellent material selected from the group consisting of wood, buckhorn, polymer or metal.

In a further embodiment of the multipurpose tool (101), the largely hemispherical weight may be formed with a smooth surface. A smooth surface of the largely hemispherical weight is advantageous in respect of gentle treatment of the fish to be stunned. Using sticks or sharp-edged devices in particular may result in such injuries to the fish which cause pain during stunning. The infliction of pain or suffering is to be avoided, however, according to §13 (1) TierSchlV. Furthermore, a blow with sharp-edged tool may be disfiguring the fish, which is to be avoided in the case of fish intended for consumption. A smooth surface of the stunning tool (106) moreover may diminish the risk of injury for the user. A further advantage related to a smooth surface of the stunning tool (106) concerns the elimination of contaminations from the surface, which is easier with a smooth surface, in that deposition of skin particles and associated surface flora in grooves and scratches is hampered. Therefore, the multipurpose tool (101) formed with a smooth surface of the stunning tool (106) is suitable for the hygienic processing of several fish, since the spreading of tissue scraps is avoided at large.

In a further implementation of the multipurpose tool (101) of the invention, the stunning tool (106), being formed as a largely hemispherical weight, may be leveled at the pole of the sphere (110) in parallel to the width (111) of the multipurpose tool (101). Additionally, the stunning tool (106) may be leveled in parallel to the lateral members (105) serving as handle, such that the value of the largest width (112) of the stunning tool (106) is smaller than the value of the largest width (111) of the multipurpose tool (101). The weight of the stunning tool (106) thus arranged, advantageously is limited to a small spatial extension due to the leveled pole (110) and the leveled side parts.

Therefore, the stunning blow may be conducted highly focused without injuring the fish on one hand; on the other hand, the multipurpose tool (101) with its relatively small stunning tool (106) is easily conveyable by the user. A preferred width (112) of the stunning tool (106) is in between 1.5 and 3.5 cm.

In another embodiment of the multipurpose tool (101) of the invention, the evisceration knife (107) may be formed with a knife blade (113) arranged in a longitudinal direction, wherein the evisceration knife (107) in a resting position is situated in the recess in between the lateral members (105). In the resting position, the knife blade (113) is averted from the user, but may be folded into a position of use, which is parallel to the parallel arranged interior sides of the lateral members (105) and which is defined by at least one abutment point. Thereby, the sharpened and bent knife tip (114) of the evisceration knife (106) being formed largely as a half of the letter U may be fitted with a knob (115). The knife tip (114) of the evisceration knife (106) may exhibit a hollow-, surface- or Ballig-grinding; a hollow grinding is preferred. The sharpened knife tip (114), being bent largely in the form of a half of the letter U, with a knob (115) is suited excellently to be used for slicing the fish after bleeding. Slicing (german "aufschärfen") means the transection of the animal's skin. From the state of the art, slicing hooks are known in the context of game hunting, whereby the actual hook is formed as regular hunting knife on the side averted from the knife's blade. Generally, the hook is formed as a "V" and is suited especially for slicing game with a thick rind, e.g. wild boar. In contrast, the evisceration knife (107) of the invention is arranged with a knife tip (114) in the form of a sharpened half U and a knob (115) facing the knife spine (116), which serves to gently push aside the visceral organs while slicing. The tip (114) of the evisceration knife (107) is suited excellently to transect fish skin without tearing it, since it is significantly thinner compared to skin of game. By using a regular slicing hook, the skin of even larger fish would tear open or rip apart, resulting in the breaking free of the hook/knife, such that the knife has to be reinserted for continuation of the slicing procedure. The evisceration knife (107) of the invention with its sharpened, bent tip (114) formed with a knob (115), however, allows for gentle transection of the fish skin in a single cut, which also may be practiced by inexperienced anglers. The knob (115) at the knife tip (114) protects advantageously the visceral organs against injury by the cutting edge of the knife tip (114). In particular, injury of the gallbladder is prevented efficiently, thereby inhibiting the penetration with bile of those parts of fish intended for consumption. The knob (115) may further be used to move the evisceration knife (107) from a resting position into a position of use without exposing the user to the danger of being hurt by touching the sharpened and bent knife tip (114) of the evisceration knife (107). Advantageously, the bent and sharpened knife tip (114) may be used during actual killing for transection of the arteries of the gill.

In a further implementation of the multipurpose tool (101) of the invention, the evisceration knife (107) may be formed with a scaling tool (117) within that half of the knife spine (116) which is localized remotely from the handle (104). The scaling tool (117) may be arranged with a surface of the type of a rasp, of a grater, of a small saw with largely blunted teeth, or of a file. In particular, it is advantageous to scale fish prior to evisceration when processing fish with scales being hard to remove (e.g. predatory fish like pike and zander), which nevertheless have to be removed before consumption.

Fish may thus be efficiently cleaned and scaled prior to opening the abdominal cavity, thereby preventing contamination with bacteria. After removing the scales, the evisceration knife (107) may be turned around towards the knife blade (113) in order to transect rapidly the skin without the need for a thorough cleaning of the working tool in between steps, since the knife blade (113) and the scaling tool (117) are formed at a spatial distance.

In another embodiment of the multipurpose tool (101) of the invention, the scraping tool (108) may be blunted in a circumferential direction and be formed with a blunt end. This scraping tool (108) may be used for gentle removal of the visceral organs after transection of the abdominal wall. Due to the blunted edges, injury to visceral organs (e.g. intestines, gallbladder) associated with the leakage of bile is prevented while at the same time reducing the germ load of those parts of fish intended for consumption.

The largely elliptical, shallow recess (118, which is localized remotely from the handle (104) and which exhibits a planar surface in its lower part, may be used in the way of a spoon in order to scrape tissues within the abdominal cavity, whereby injury of those parts of the fish intended for consumption (i.e. by cutting) is avoided due to the circumferentially blunted edges. Utilizing the working end of the blunted scraping tool (108), soft tissue, such as e.g. kidneys, may be removed in an excellent manner from a hard substrate, e.g. the spine, without injuring surrounding tissues.

In a preferred implementation, the circumferentially blunted, blunt ended scraping tool (108) may be formed with a length corresponding to the 0.70 to 0.95 fold of the length of the evisceration knife (107). Preferably, it's length may correspond to the 0.75 to 0.90 fold of the length of the evisceration knife (107), particularly preferred to the 0.75 of the length. In this way, the weight of the tool is kept small on one hand, on the other hand, the relatively short cantilever—overall length being sufficient—allows for efficient scraping, in order to remove completely soft tissues localized at a distance from the abdominal surface.

BRIEF DESCRIPTION OF THE DRAWINGS

These and other objects of the invention, as well as many of the intended advantages thereof will become more readily apparent when reference is made to the following description taken in conjunction with the accompanying drawings. The specific implementations thereby serve as examples are not limiting the invention.

FIG. 7 B depicts a spatial relation of the same section of the insert (5) formed as a double cone (4) to the handle (2) which is formed with a plate (42).

In FIG. 8 B, the insert (5) of the invention is depicted from a top view, while in FIGS. 8 C and 8 D, the insert (5) is shown from a front view (C) and a view from below (D).

DETAILED DESCRIPTION OF THE PREFERRED EMBODIMENTS

Figure 1:
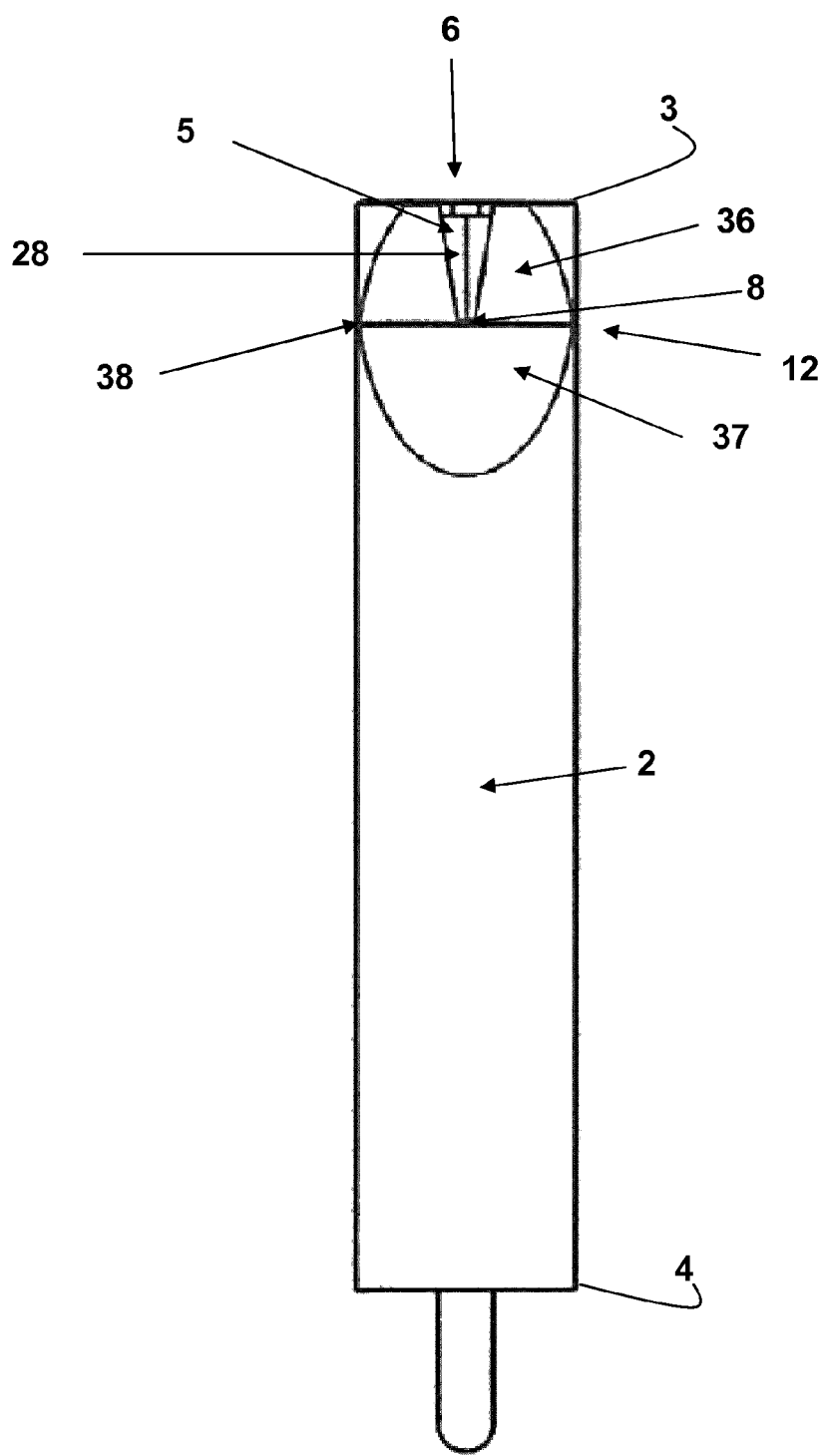
FIG. 1 depicts a schematic side view of the threading device (1) of the invention.

FIG. 1 depicts a schematic side view of the threading device (1) according to the invention. In the preferred embodiment, the handle (2) is arranged longitudinally with an anterior (3) and posterior end (4) for easy grasp between two or more fingers of a hand during threading. The first recess (6) with a largely conical taper, being situated in the anterior end (3) of the handle (2) is a visible in this side view via the opening (11) running along the generatrix (10, not shown). The insert (5), being placed within the first recess (6), is arranged with a slit opening (28), which is situated largely in the middle of the first recess' (6) opening (11). In the preferred embodiment, the second recess (12) is formed as a bipartite notch, encompassing thereby the top surface (36) of the second recess (12), which is perforated by the opening (11) of the first recess (6) and which forms part of the outer wall of the first recess (6). The second recess (12) is characterized by the by a bottom surface (37) facing the posterior end (4). In the embodiment shown, the bottom surface (37) exhibits a larger a square measure than the top surface (36) of the second recess (12). The top (36) and the bottom surface (37) are connected along an axis of symmetry at an oblique angle (41, not shown) by a straight line, which runs at the height of the floor surface (8) of the first recess (6). The posterior end (4) of the handle (2) of the threading device (1) exhibits an arcuate sling for affixing the threading device (1).

Figure 2:
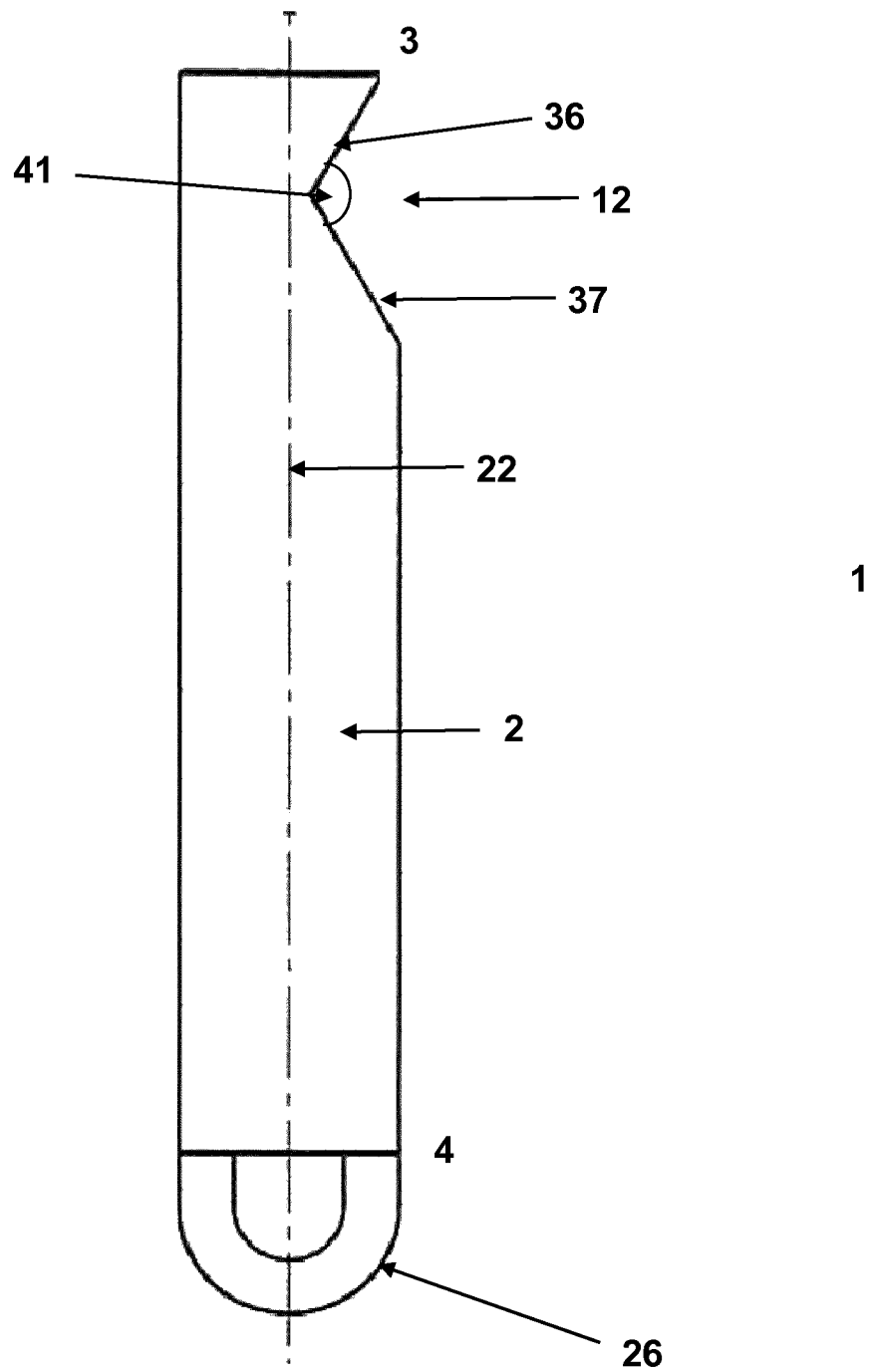
FIG. 2 shows schematic side view of the threading device (1) of the invention, wherein the threading device (1) is turned 90°.

FIG. 2 shows schematic side view of the threading device (1) of the invention, wherein the threading device (1) is turned 90°. From this perspective, the dimensioning of the second recess (12), being arranged in the anterior quarter of the handle (2) becomes apparent, wherein the anterior quarter is measured in relation to the overall length of the handle (2). The top surface (36) facing the anterior end (3) forms part of the outer wall of the first recess (6). Top (36) and bottom surface (37) are connected to each other in an oblique angle of 120°. The course of direction of a fishing line (22) within the handle (2), when conducted through the threading device (1), is indicated as broken line.

Figure 3:
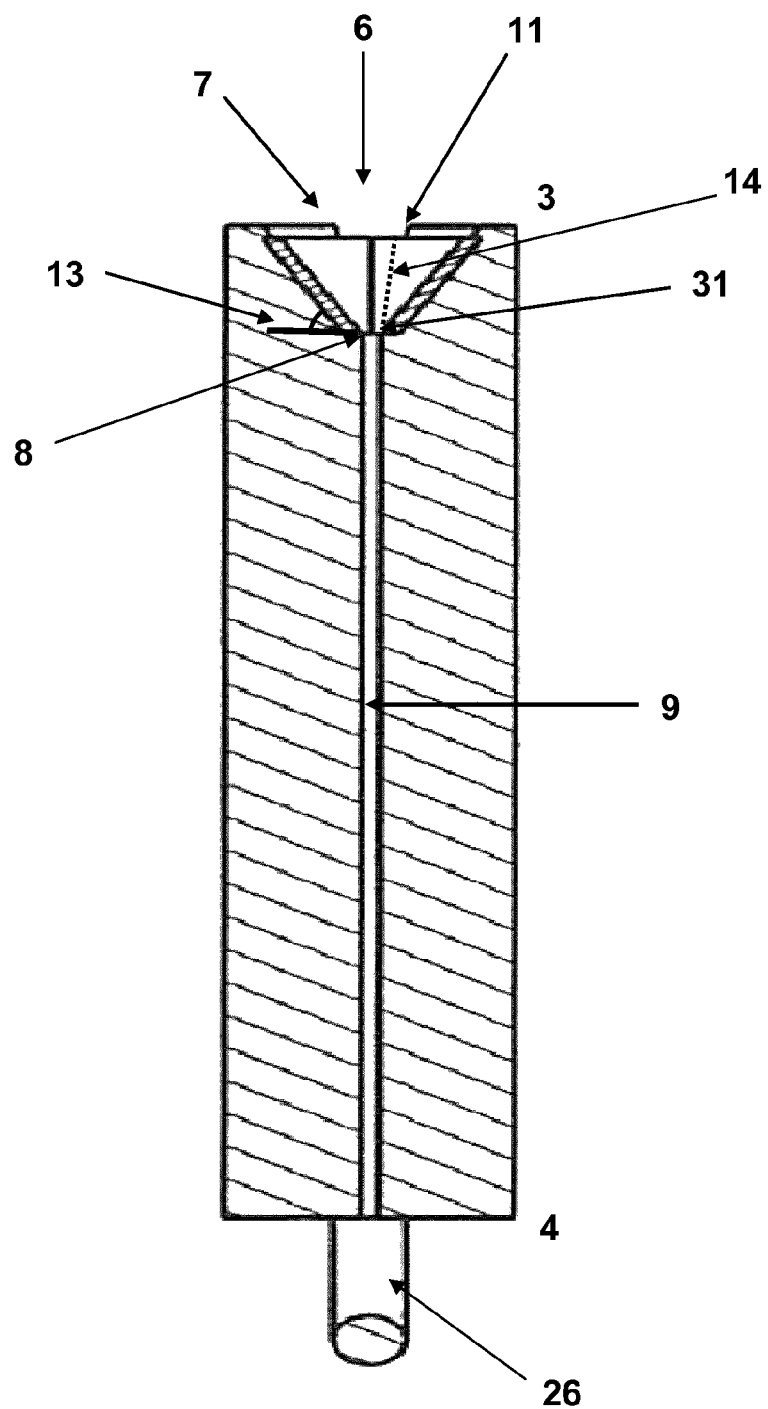
In FIG. 3, a schematic view of a longitudinal section of the threading device (1) of the invention is depicted.

In FIG. 3, a schematic view of a longitudinal section of the threading device (1) of the invention is shown with the entrance aperture (7) facing the anterior end (3) of the first recess (6) formed with a largely conical taper. The slit opening (28) of the insert (5) localized within the first recess (6) is formed in the middle of the opening (11) of first recess (6) at large. The cylindrical cavity (9), being localized within the handle (2) and being open to the anterior (3) and posterior end (4), is arranged in the form of right circular cylinder. The cylindrical cavity (9) connects to the floor surface (8) of the first recess (6) via the floor surface aperture (31) and continues up to the posterior end (4), which is formed with an arcuate sling (26). The tilt angle (13, depicted as an extension line of the floor surface (8)) of the first recess (6) with a largely conical taper may be calculated by using the diameter of the entrance aperture (7), the diameter of the floor surface (8) and the height of the cone (14, broken line); here it is 29°.

Figure 4:
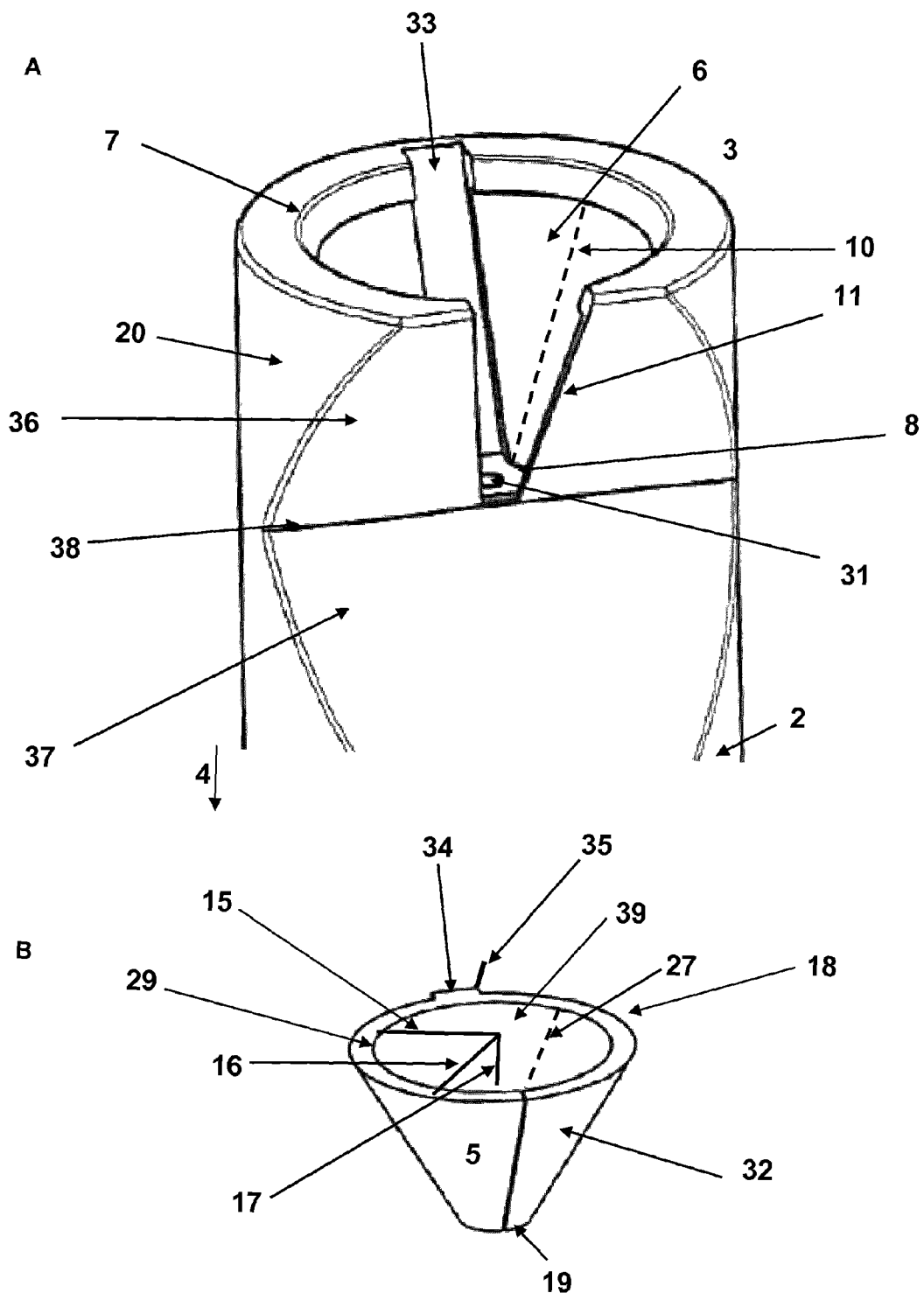
FIG. 4 A depicts an isometric partial view of the anterior end (3) of the threading device (1) of the invention and FIG. 4 B depicts an isometric view of the isolated insert (5), wherein in both cases, the observer's view is from frontal left above.

FIG. 4 A depicts an isometric partial view of the anterior end (3) of the threading device (1) of the invention, wherein the observer's view is from frontal left above. The first recess (6) with a largely conical taper, being situated in the anterior end (3) of the handle (2), is characterized by the opening (11) along the generatrix (10, broken line) as well as by an entrance aperture (7) and a floor surface (8). The floor surface (8) facing the posterior end (4) is formed with a floor surface aperture (31), which continues into the cylindrical cavity (9). The first recess (6) may be accessed from the handle's (2) outer face (20) not only via the entrance aperture (7), but also via the opening (11) along the generatrix (10). Using the guiding channel (33) formed along the whole length of the generatrix (10) the insert (5) may be adjusted conveniently within the first recess (6) such that the slit opening (28) of the insert (5) comes to sit largely in the middle of the opening (11) of first recess (6). The second recess (12) preferably is arranged in the form of a bipartite notch, wherein the top surface (36), encompassing the opening (11), forms part of the outer wall of the first recess (6). Top (36) and bottom surface (37, depicted only partially) are connected with each other at an oblique angle in a straight line running along the height of the floor surface (8).

FIG. 4 B depicts an isometric view of the isolated insert (5), wherein the observer's view is from frontal left above. The insert is characterized by an insert entrance aperture (18) facing the anterior end (3) and an insert outlet aperture (19) facing the posterior end (4), wherein the insert entrance aperture (18) is formed with a larger diameter than the insert outlet aperture (19). In this perspective, the insert inner surface (39) is visible by way of the insert entrance aperture (18). The form of the insert (5) is complementary to the form of the first recess (6). The preferred implementation the insert is a hollow cylinder with a conical taper, which is characterized by an inside radius (15), an outside radius (16) and a height (17, depicted partially), wherein the inside radius (15) and the outside radius (16) are reduced evenly to a large extent along the height (17) in the direction of the insert outlet aperture (19), corresponding to a hollow cylinder with a conical taper. The difference between the outside radius (16) and the inside radius (15) is a measure of the wall thickness (29) of the insert (5). The insert is arranged with a slit opening (28) running along the insert's generatrix (27), serving as a stabilizer of the eye (23) and the shank (25) of the hook and as a guide for the shank (25).

The insert (5) is formed on its outer surface (32) with a profile (34) complementary to the guiding channel (33) of the first recess (6). By means of a strap (35) the insert (5) may be removed conveniently from the first recess (6) after threading.

Figure 5:
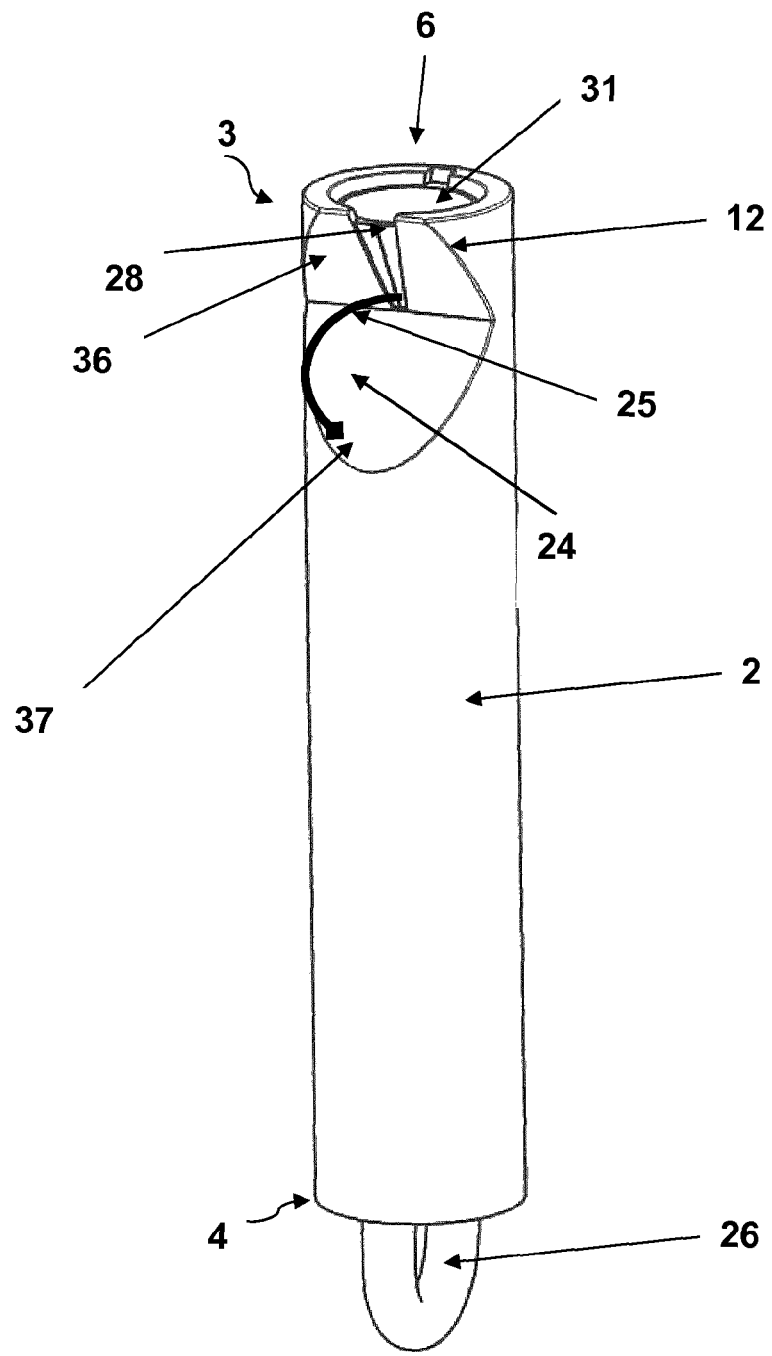
FIG. 5 depicts an isometric view of the threading device (1) of the invention with a fixed hook (21), wherein the observer's view is from frontal right above.

FIG. 5 depicts an isometric view of the threading device (1) of the invention with a fixed hook (21), wherein the observer's view is from frontal right above, wherein, for clarification, the hook is not drawn to scale. The shank (25) of the hook is clamped stably into the slit opening (28) of the insert (5), set in the first recess (6), in order to adjust the head of the hook (30, not visible) comprising the eye (23, not visible) in relation to the floor surface (8) and to provide for a spatial relation between them as close as possible. The orientation of the point of the hook (24) depends, in part, on the geometrical form of the hook (21); preferably, the point of the hook (24) comes to be situated in the second recess (12) for keeping the risk of injury during threading as small as possible. The point of the hook (24) may be oriented towards the top (36) or the bottom surface (37) of the second recess (12).

Figure 6:
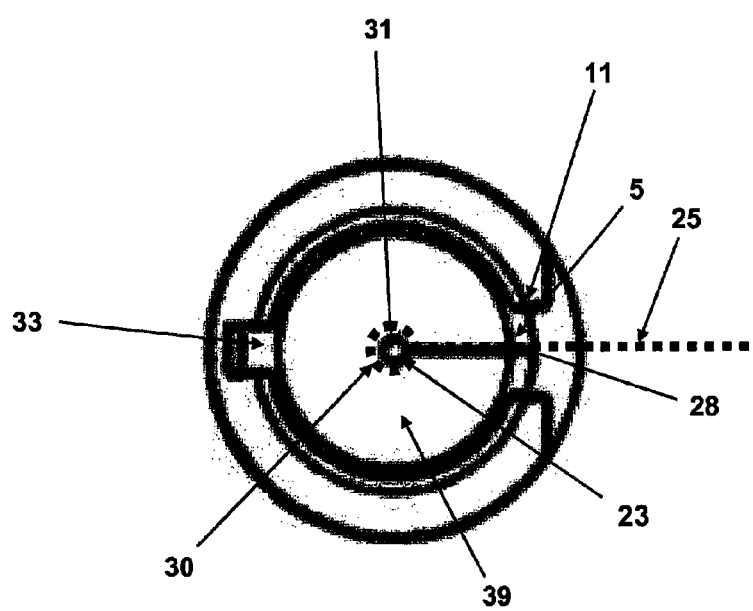
In FIG. 6, a schematic top view is depicted of the anterior end (3) of the threading device (1) of the invention with a fixed hook (21).

In FIG. 6, a schematic top view is depicted of the anterior end (3) of the threading device (1) of the invention with a fixed hook (21). The head of the hook (30) comprising the eye (23) is adjusted around the floor surface aperture (31) of the base surface (8, hidden). The shank of the hook (25) is stabilized via the slit opening (28) of the insert (5).

Figure 7:
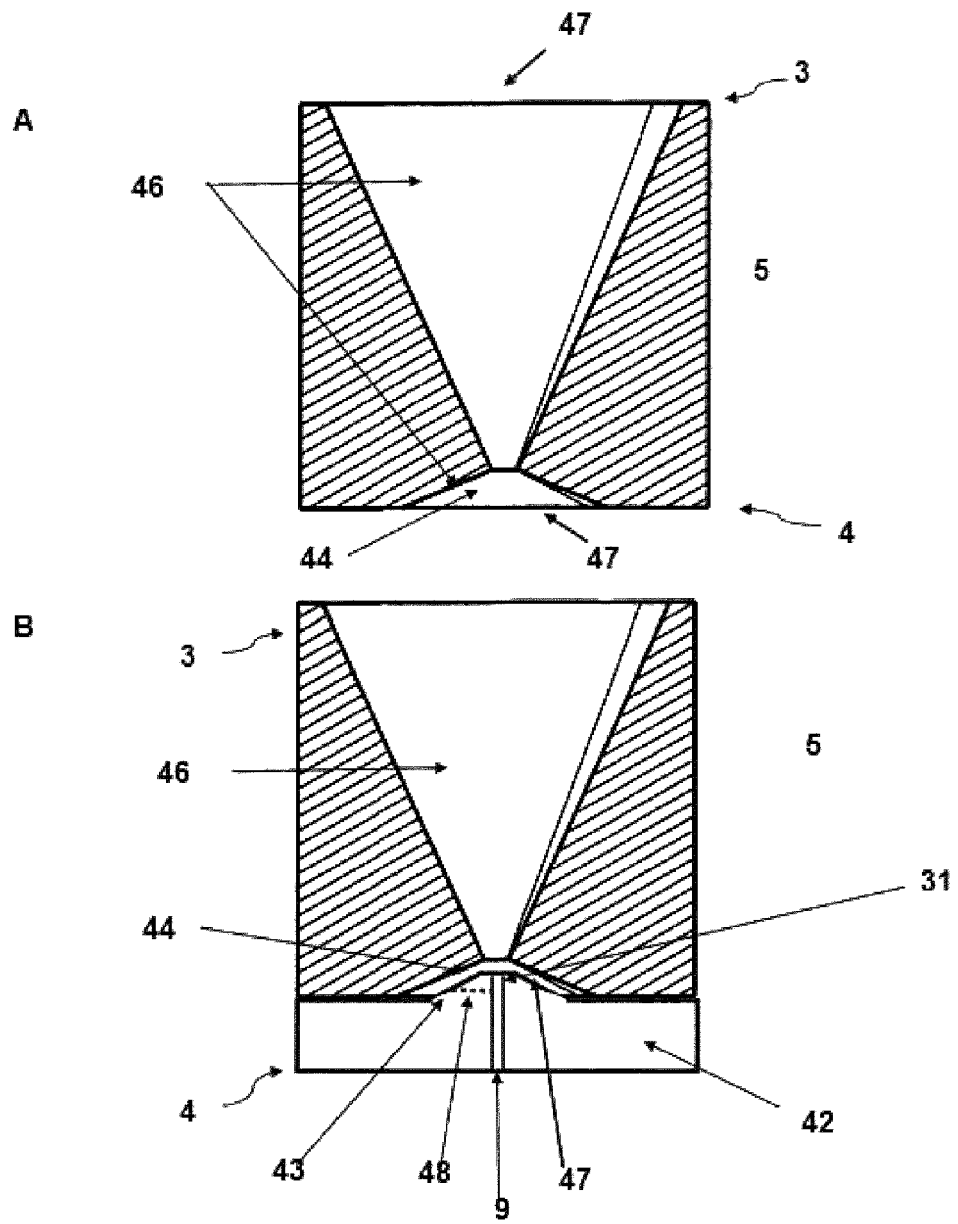
FIG. 7 A exhibits a longitudinal section of an embodiment of the insert (5) of the invention, wherein it's interior is formed as a double cone (46).

FIG. 7 A exhibits a longitudinal section of an embodiment of the insert (5) of the invention, wherein it's interior is formed as an asymmetrical double cone (46). The outer surface (32) of the insert (5), however, is configured largely as a cone. The insert entrance aperture (47) of the double cone (46) facing the posterior end (4) of the handle (2) is configured with a smaller diameter as that insert entrance aperture (47) of the double cone (46) facing the anterior end (3) of the handle (2).

FIG. 7 B depicts a spatial relation of the same section of the insert (5) formed as a double cone (4) to the handle (2) which is formed with a plate (42). The insert entrance aperture (47) of the double cone (46) facing the posterior end (4) of the handle (2) serves as accepting means (44) for the complementary engagement means (43), which are configured as a frustum like increment. Preferably, engagement means (43) are arranged on a removable and/or slidable plate of a multi-part handle (2) such that it connects directly to the floor surface aperture (31) of the cylindrical cavity (9), which in turn is arranged within the plate (42). The radius (48) of the frustum is configured such that engagement means may interact interlockingly with accepting means (44) formed by insert entrance aperture (47) of the double cone (46).

Figure 8:
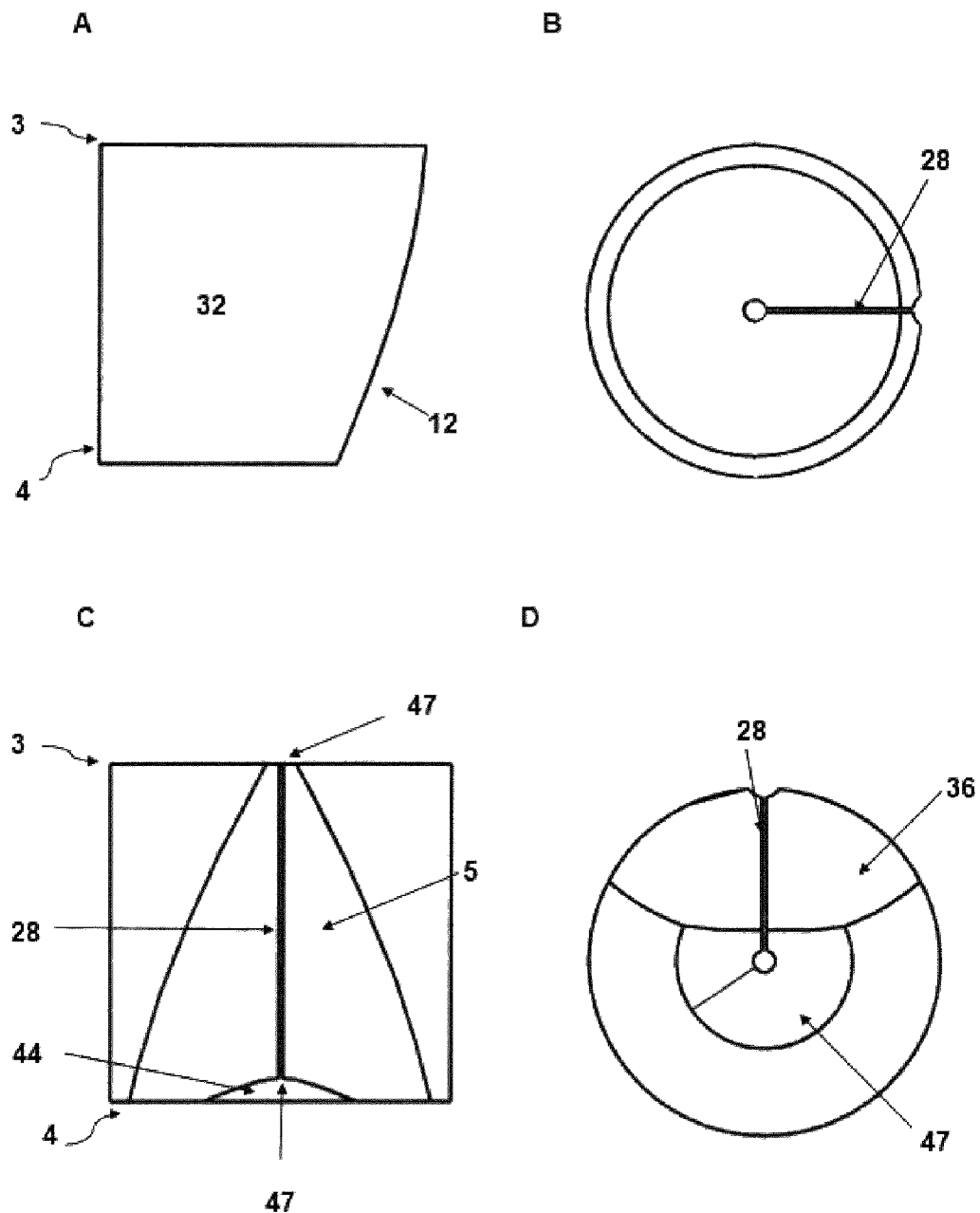
In FIG. 8 A, a schematic side view of the insert (5) of the invention is shown, wherein it's interior is formed as a double cone (46).

In FIG. 8 A, a schematic side view of a preferred embodiment of the insert (5) of the invention is shown, wherein it's interior is formed as a double cone (46). In this drawing, the outer surface (32) of the insert (5) is formed with at least one obliqueness. This obliqueness is defining the second recess (12), which in this embodiment is formed to a large part by outer surface (32) of the insert (5). Positions of the anterior (3) and the posterior end (4) of the handle (2, not shown) are indicated for orientation.

In FIG. 8 B, the insert (5) of the invention is depicted from a top view, while in FIG. 8 C the insert (5) is shown from a front view. In both cases, the slit opening (28) is readily apparent. The obliqueness is providing for the top surface (36) of the second recess (12), which in this embodiment is formed to a large part by outer surface (32) of the insert (5). Preferably, the lower insert entrance aperture (46) of the double cone (46) serves as accepting means (44).

In FIG. 8D, the insert of the invention is depicted from below, wherein the obliqueness of outer surface (32) of the insert (5) forming the top surface (36) of the second recess (12) is readily apparent.

Figure 9:
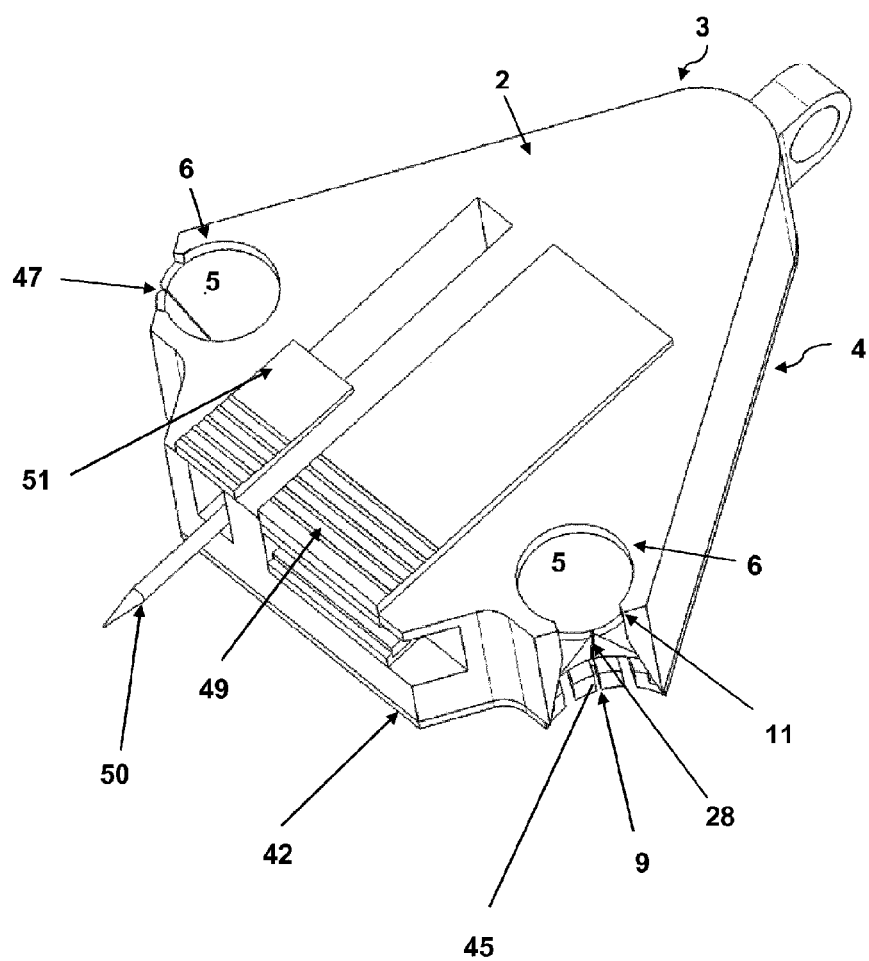
FIG. 9 exhibits an isometric view of an embodiment of the threading device (1) of the invention with two first recesses (6), the observer's perspective being frontal right above.

In FIG. 9 an isometric view of a preferred embodiment of the threading device (1) of the invention. The threading device (1) of the invention is configured with a handle in the form of a isosceles triangle, whose height is equal to or smaller than its width. The handle (2) is a multi-part handle (2) being arranged on its posterior end (4) with a removable and/or slidable plate (42). The threading device (1) is configured with two first recesses (6), whose inserts (5) are formed as double cones (46) at their respective interiors. Respective cylindrical cavities (9), being open towards the anterior (3) and the posterior end (4) are arranged within the plate (42) of the handle (9) and continue into the respective first recesses (6) via their respective base surface apertures (31). Preferably, the two second recesses (12) of the threading device (1) are formed to large part in the respective outer surfaces (32) of the inserts (5). These slit openings (28) of the inserts (5) may be accessed via the outer face (20) of the handle (2). When configured in the way of the multipurpose tool, the threading device (1) of the invention is arranged with a line clipper (49) located in the handle (2). Within the handle (2) there is also a puncturing aid (50) for flies, which may be shifted between a working and a resting position via a clamping mechanism (51).

Figure 10:
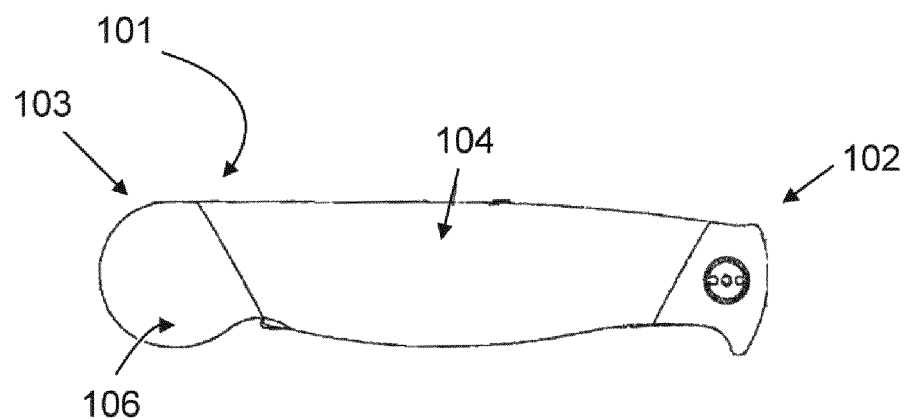
In FIG. 10, a schematic side view of the multipurpose tool (101) of the invention is shown, wherein the at least two working tools are folded into a resting position.

FIG. 10 depicts a schematic drawing of the multipurpose tool (101) of the invention for stunning and evisceration of fish, wherein the at least two working tools are situated in a folded position (resting position). In the embodiment thus represented, the multipurpose tool (101) is formed longitudinally with an anterior (102) and a posterior end (103). The longitudinal multipurpose tool (101) thereby exhibits two firmly attached lateral members (105), serving as handle (104). Each of the working tools, depicted here in a resting position, may be unfolded from the recess in between the lateral members (105) into a position of use, which is defined by at least one abutment point. At the posterior end (103) of the multipurpose tool (101), the largely hemispherical stunning tool (106) is located, preferably consisting of a metal or an alloy. Due to the higher weight at the posterior end (103) of the multipurpose tool (101), the center of mass of the multipurpose tool (101) is distributed advantageously such that the weight of the posterior third of the multipurpose tool (101), encompassing the posterior end (103), is equal to or larger than half of the overall weight of the multipurpose tool (101).

This specific distribution of weight in the direction of the stunning tool (106) enables an excellent transmission of power, originating from the blow movement conducted by the angler, to the skull of the fish to be stunned. Transmission may be easily controlled by the angler, since the multipurpose tool (101) is ergonomically formed and since the multipurpose tool (101) of the invention is of a smaller size compared to conventional sticks or bats. The largely hemispherical weight of the stunning tool (106) at the posterior end (103), exhibiting a smooth surface as depicted in the present embodiment, is formed with a coating (109) made from metal, and alloy or a thermoplastic and/or duroplastic polymer. In between the weight of the stunning tool (106) and its coating (109), the gap may be localized; it is preferred, that the coating (109) is within close proximity to the weight of the stunning tool (106) in order to avoid penetration of impurities.

Figure 11:
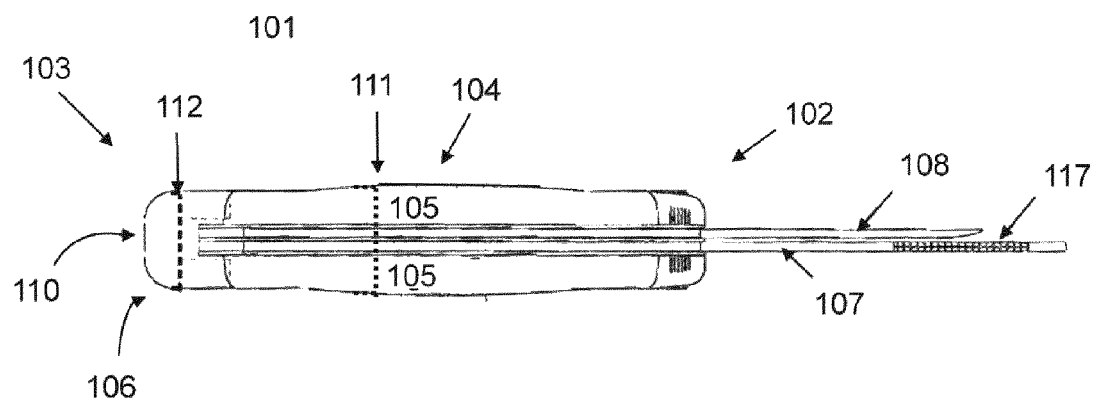
FIG. 11 depicts a schematic top view of the multipurpose tool (101) of the invention, wherein the at least two working tools are in a position of use.

In FIG. 11, a top view of the multipurpose tool (101) of the invention is depicted in a preferred longitudinal embodiment with an anterior (103) and posterior end (104). The at least two working tools are folded out of the recess in between the two lateral members (105) into a position of use up to an abutment point, the working tools in the present case representing a evisceration knife (107) encompassing a scaling device (117) and a scraping tool (108). The stunning tool (106), being formed as a largely hemispherical weight, is localized at the posterior end (103) and is leveled at the pole of the sphere (110) in parallel to the width (111) of the multipurpose tool (101). Furthermore, the stunning tool (106) is the leveled in parallel to the lateral members (105) serving as handle (104). The flattening is selected such that the largest width (112) of the stunning tool (106) is smaller than the value of the largest width (111) of the multipurpose tool (101). Thus, the weight of the stunning tool (106) is limited to a small spatial extension due to the leveled pole of the sphere (110) and the leveled side parts. Due to the dimensioning, the stunning blow may be conducted highly focused without injuring the fish on the one hand, on the other hand, the multipurpose tool with its relatively small stunning tool (106) may be transported easily by the user.

In another embodiment of the multipurpose tool (101) of the invention, a number of further, small working tools useful for the angler while handling the fish may be incorporated into the lateral members (105) serving as a handle (104), e.g. forceps for removing the hook or a line clipper.

Figure 12:
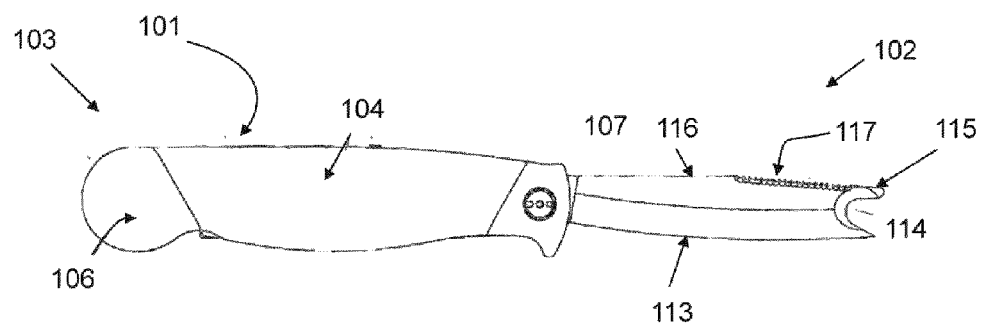
In FIG. 12, a schematic side view of the multipurpose tool (101) of the invention is shown, wherein the evisceration knife (107) is in a position of use.

FIG. 12 depicts a schematic side view of the multipurpose tool (101) of the invention, wherein the evisceration knife (107) is in a position of fuse. The evisceration knife (107) is formed with a blade (113), a spine (116) and a knife point (114). The knife point (114) consists of a sharpened, preferably concave point (114), bend largely in the form of half a letter U, and a knob (115), into which the spine (116) may extend. In particular, the knob (115) is adapted to prevent the visceral organs of the fish from contacting the spine (116) and the knife point (114) while slitting the abdominal wall of the fish. Further, the knob (115) may be used for folding the evisceration knife (107) from a resting position into a position of use. The knob (115) is formed advantageously on the spine (116) such that in a resting position, it extends from the recess in between the lateral members (105) to be lifted easily by the user into a position of use via a fingertip.

In that half of the spine (116), which is located as a distance from the handle (104), the evisceration knife (107) is arranged with a scaling tool, (117), which preferably exhibits small, saw tooth-like indentations.

Figure 13:
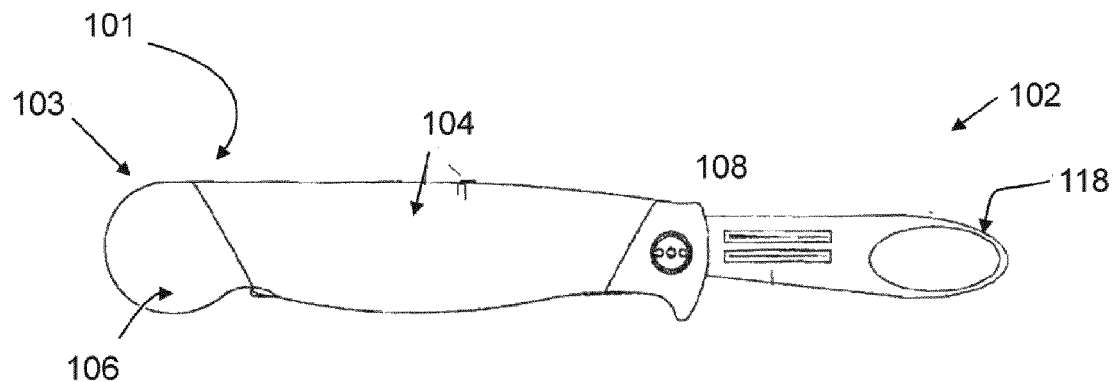
FIG. 13 shows a schematic side view of the multipurpose tool (101) of the invention, wherein the scraping tool (108) is in a position of use.

FIG. 13 shows a schematic side view of the multipurpose tool (101) of the invention, wherein the scraping tool (108) is folded into a position of use. The scraping tool (108) is blunted in a circumferential direction and preferably exhibits blunt end. In the half of the scraping tool (108) which is located in a remote position in relation to the handle (104), there is a largely elliptical shallow recess (118), which shallow recess (118) exhibits a planar surface in its lower part. The scraping tool (108) may be used in the way of a spoon, thereby being suited excellently for removing soft tissue, e.g. kidneys, from a hard substrate, e.g. the spine, without injuring surrounding tissues. The length of the scraping tool (108) preferably corresponds to 0.70 to 0.95 fold of the length of the evisceration knife (107), especially preferred, its length is 0.75 times the length of the evisceration knife (107). In addition, the scraping tool (108) is formed with two customary sharpeners for hooks of two different granularities.

LIST OF REFERENCE SIGNS 1 threading device (1) for a hook
2 handle
3 anterior end of the handle
4 posterior end of the handle
5 insert
6 first recess
7 entrance aperture of the first recess
8 base surface of the first recess
9 cylindrical cavity
10 generatrix
11 opening of the first recess
12 second recess
13 tilt angle
14 cone height
15 inside radius insert
16 outside radius insert
17 insert height
18 insert entrance aperture
19 insert outlet aperture
20 handle outer face
21 hook, artificial flies
22 line
23 hook eye
24 hook point
25 hook shank
26 sling
27 insert generatrix
28 slit opening
29 wall thickness insert
30 hook head
31 base surface aperture
32 insert outer surface
33 guiding channel
34 insert profile
35 insert strap
36 second recess top surface
37 second recess bottom surface
38 straight line
39 insert inner surface
40 threading set
41 angle
42 plate
43 engagement means
44 accepting means
45 slit opening cavity
46 double cone
47 insert entrance aperture, double cone
48 radius frustum
49 line-clipper
50 puncturing aid
51 clamping mechanism
101 multipurpose tool
102 anterior end multipurpose tool
103 posterior end multipurpose tool
104 handle
105 lateral members
106 stunning tool
107 evisceration knife
108 scraping tool
109 coating
110 pole of sphere
111 multipurpose tool width
112 stunning tool width
113 evisceration knife blade
114 evisceration knife, knife point
115 knob
116 spine
117 scaling tool
118 shallow recess

The invention claimed is:

1. A multipurpose tool (101) of the type of a pocket knife for stunning and eviscerating fish, with an anterior (102) and a posterior end (103), comprising at least two working tools, which are arranged for safeguarding between two lateral members (105), said lateral members (105) serving as a handle (104) and being firmly attached to each other, wherein
each working tool is unfoldable into a position of use oriented in parallel to the lateral members (105), whereby said position of use is defined by at least one abutment position, wherein the lateral members (105) are arranged largely in parallel, characterized in that
the posterior end (103) of the multipurpose tool (101) is arranged as a stunning tool (106), said stunning tool (106) being formed as a largely hemispherical weight, leveled at the pole of the sphere (110) in parallel to the width (111) of the multipurpose tool (101), leveled in parallel to the lateral members (105) serving as the handle such that the value of the largest width (112) of the stunning tool (106) is smaller than the value of the largest width (111) of the multipurpose tool (101), and made from metal or an alloy, wherein the center of mass of the multipurpose tool (101) is distributed such that the weight of the posterior third of the multipurpose tool (101), encompassing the posterior end (103), is equal to or larger than half of the overall weight of the multipurpose tool (101), and
the at least two working tools including an evisceration knife (107) and a blunt ended scraping tool (108).

2. The multipurpose tool (101) according to claim 1, wherein the weight of the multipurpose tool is up to 750 g.

3. The multipurpose tool (101) according to claim 1, wherein the stunning tool (106), being formed as a largely hemispherical weight, is made from metal or an alloy, selected from the group consisting of titanium, stainless steel and knife steel.

4. The multipurpose tool (101) according to claim 1, wherein the stunning tool (106), being formed as a largely hemispherical weight, is formed with a coating consisting of a thermoplastic or duroplastic, synthetic, and/or biogenic polymer or of metal or an alloy, selected from the group consisting of titanium, stainless steel and knife steel.

5. The multipurpose tool (101) according to claim 1, wherein the stunning tool (106), being formed as a largely hemispherical weight, is formed with a smooth surface.

6. The multipurpose tool (101) according to claim 1, wherein the evisceration knife (107) is formed with a knife blade (113) arranged in a longitudinal direction and a sharpened knife point with a knob (115), which is bent in the form of half a letter U.

7. The multipurpose tool (101) according to claim 1, wherein the evisceration knife (107) is formed with a scaling tool (117) within that half of the knife spine which is localized remotely from the handle (104).

8. The multipurpose tool (101) according to claim 1, wherein the blunt-ended scraping tool (108) being also blunted in a circumferential direction, is formed with a largely elliptical, shallow recess (118) within that half of the knife spine (116) which is localized remotely from the handle (104), said shallow recess (118) exhibiting a planar surface in its lower part.

9. The multipurpose tool (101) according to claim 1, wherein the blunt-ended scraping tool (108) being also blunted in a circumferential direction, is formed with a length corresponding to 0.70 to 0.95 fold of the length of the evisceration knife (107).

* * * * *